US009645647B2

(12) United States Patent
Levesque

(10) Patent No.: US 9,645,647 B2
(45) Date of Patent: May 9, 2017

(54) SYSTEMS AND METHODS FOR HAPTIC FEEDBACK FOR MODULAR DEVICES

(71) Applicant: Immersion Corporation, San Jose, CA (US)

(72) Inventor: Vincent Levesque, Montreal (CA)

(73) Assignee: Immersion Corporation, San Jose, CA (US)

( * ) Notice: Subject to any disclaimer, the term of this patent is extended or adjusted under 35 U.S.C. 154(b) by 57 days.

(21) Appl. No.: 14/710,823

(22) Filed: May 13, 2015

(65) Prior Publication Data

US 2016/0334871 A1 Nov. 17, 2016

(51) Int. Cl.

| | |
|---|---|
| ***H04B 3/36*** | (2006.01) |
| ***G06F 3/01*** | (2006.01) |
| ***G06F 3/041*** | (2006.01) |
| ***G06F 1/16*** | (2006.01) |

(52) U.S. Cl.

CPC .............. *G06F 3/016* (2013.01); *G06F 1/163* (2013.01); *G06F 1/1632* (2013.01); *G06F 3/0416* (2013.01); *G06F 2200/1635* (2013.01); *G06F 2203/013* (2013.01); *G06F 2203/014* (2013.01)

(58) Field of Classification Search

CPC ........ G06F 1/163; G06F 3/016; G06F 3/0416; G06F 3/0488; G06F 2203/013; G06F 2203/014; G06F 1/1632; A63F 13/285; A63F 2300/1037

USPC ........... 340/407.1, 407.2; 345/156, 168, 173, 345/184

See application file for complete search history.

(56) References Cited

U.S. PATENT DOCUMENTS

| | | | | |
|---|---|---|---|---|
| 6,115,248 | A * | 9/2000 | Canova | G06F 1/1632 292/30 |
| 2008/0303782 | A1 | 12/2008 | Grant et al. | |
| 2008/0307459 | A1 * | 12/2008 | Migos | H04N 5/4403 725/39 |
| 2010/0283731 | A1 | 11/2010 | Grant et al. | |
| 2011/0012727 | A1 | 1/2011 | Pance et al. | |

(Continued)

FOREIGN PATENT DOCUMENTS

| | | |
|---|---|---|
| WO | WO 2013/004919 | 1/2013 |
| WO | WO 2014/021847 | 2/2014 |

OTHER PUBLICATIONS

Project Ara, web page at http://www.projectara.com/, as available via the Internet and printed May 8, 2015.

(Continued)

*Primary Examiner* — Thomas Mullen
(74) *Attorney, Agent, or Firm* — Kilpatrick Townsend & Stockton LLP

(57) ABSTRACT

One illustrative haptic output device disclosed herein includes a connector configured to couple the haptic output device to a modular computing device. The modular computing device includes an outer housing configured to mechanically and electrically couple with one or more external electronic modules. The haptic output device also includes a receiver configured to receive a haptic signal from a processor. The processor is configured to receive a signal; determine a haptic effect based in part on the signal; generate the haptic signal based on the haptic effect; and transmit the haptic signal. The haptic output device is configured to output the haptic effect responsive to receiving the haptic signal.

24 Claims, 7 Drawing Sheets

Housing 120
Computing Device 101
Memory 104
Haptic Effect Determination Module 126
Haptic Effect Generation Module 128
Network 110
I/O 112
Processor 102
Bus 106
Storage 114
Touch Sensitive Surface 116
Sensor(s) 130
Haptic Output Device 118
Touch Sensor 108
Module Holder 132a
Module Holder 132b
Module 134
Processor 138
Housing 142
Module 136
Haptic Output Device 140

(56) References Cited

U.S. PATENT DOCUMENTS

| | | | | |
|---|---|---|---|---|
| 2011/0051360 | A1 | 3/2011 | Dabov et al. | |
| 2012/0249462 | A1 | 10/2012 | Flanagan et al. | |
| 2013/0009892 | A1* | 1/2013 | Salmela | G06F 3/016 345/173 |
| 2013/0038792 | A1* | 2/2013 | Quigley | A61H 19/00 348/515 |
| 2014/0035736 | A1* | 2/2014 | Weddle | G05D 1/005 340/407.2 |
| 2014/0354570 | A1* | 12/2014 | Makinen | G06F 3/041 345/173 |
| 2015/0040005 | A1* | 2/2015 | Faaborg | H04M 19/047 715/702 |
| 2015/0072789 | A1 | 3/2015 | Heubel et al. | |
| 2016/0094259 | A1* | 3/2016 | Hatanaka | H04B 1/385 455/90.2 |
| 2016/0187988 | A1 | 6/2016 | Levesque et al. | |

OTHER PUBLICATIONS

Mophie Pulse Manual, Juice Pack Pulse, User Manual—Made for $4^{th}$ Generation iPod Touch, web page at www.mophie.com, 2012.

Dotson, K., Mophie Pulse Brings Shake, Rattle, and Roll to the iPod Touch, SiliconANGLE Network, web page at http://siliconangle.com/blog/2011/01/06/mophie-pulse-brings-shake-rattle-and-roll-to-the-ipod-touch/, as available via the Internet, 2011.

NEX, The NEX Band, The Worlds First Modular Smart Band by Mighty Cast, web page at http://www.mightycast.com/#nexband, as available via the Internet, 2014.

Blocks Wearables, Web page at www.chooseblocks.com, as available via the Internet, 2015.

Moussette, C. et al., Designing through Making: Exploring the Simple Haptic Design Space, TEI '11 Proceedings of the fifth international conference on Tangible, embedded, and embodied interaction, pp. 279-282, ACM New York, NY, USA © 2011.

Google's Project Ara: Reinventing the Smartphone with Building Blocks, The Verge, web page at https://www.youtube.com/watch?v=PQqudiUdGuo, published Apr. 15, 2014.

Phonebloks, web page at https://www.youtube.com/watch?v=oDAw7vW7H0c, published Sep. 10, 2013.

European Patent Office, Extended European Search Report, Application No. 16168639 dated Sep. 15, 2016.

Rumble Pak, from Wikipedia, web page at https://en.wikipedia.org/wiki/Rumble_Pak, as available via the Internet and last modified Nov. 14, 2016.

* cited by examiner

SYSTEMS AND METHODS FOR HAPTIC FEEDBACK FOR MODULAR DEVICES

FIELD OF THE INVENTION

The present invention relates to the field of user interface devices. More specifically, the present invention relates to haptic feedback for modular devices.

BACKGROUND

As computing devices become more prevalent, the ability of consumers to customize their computing devices is becoming increasingly important. Recently, computing devices have been developed that are modular. Modular computing devices may have outer housings (e.g., frames) to which a user can couple interchangeable modules. The modules can include hardware and/or software configured to provide the computing device with particular functionality. However, some modular computing devices may lack haptic feedback capabilities. It may be desirable to improve modular computing devices through the use of haptic feedback (e.g., mechanical vibrations).

SUMMARY

Embodiments of the present disclosure comprise haptic feedback for modular devices. In one embodiment, a haptic output device of the present disclosure may comprise a connector configured to couple the haptic output device to a modular computing device. The modular computing device may comprise an outer housing configured to mechanically and electrically couple with one or more external electronic modules. The haptic output device may also comprise a receiver configured to receive a haptic signal from a processor. The processor may be configured to receive a signal, determine a haptic effect based in part on the signal, generate the haptic signal based on the haptic effect, and transmit the haptic signal. The haptic output device may further be configured to output the haptic effect responsive to receiving the haptic signal.

In another embodiment, a method of the present disclosure may comprise: receiving a signal; determining a haptic effect based at least in part on the signal; and transmitting a haptic signal associated with the haptic effect to a haptic output device. The haptic output device may comprise a connector configured to couple the haptic output device to a modular computing device. The modular computing device may comprise an outer housing configured to mechanically and electrically couple with one or more external electronic modules. The haptic output device may be configured to receive the haptic signal via a receiver and output the haptic effect. Yet another embodiment comprises a computer-readable medium for implementing such a method.

These illustrative embodiments are mentioned not to limit or define the limits of the present subject matter, but to provide examples to aid understanding thereof. Further embodiments are discussed in the Detailed Description, and additional description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
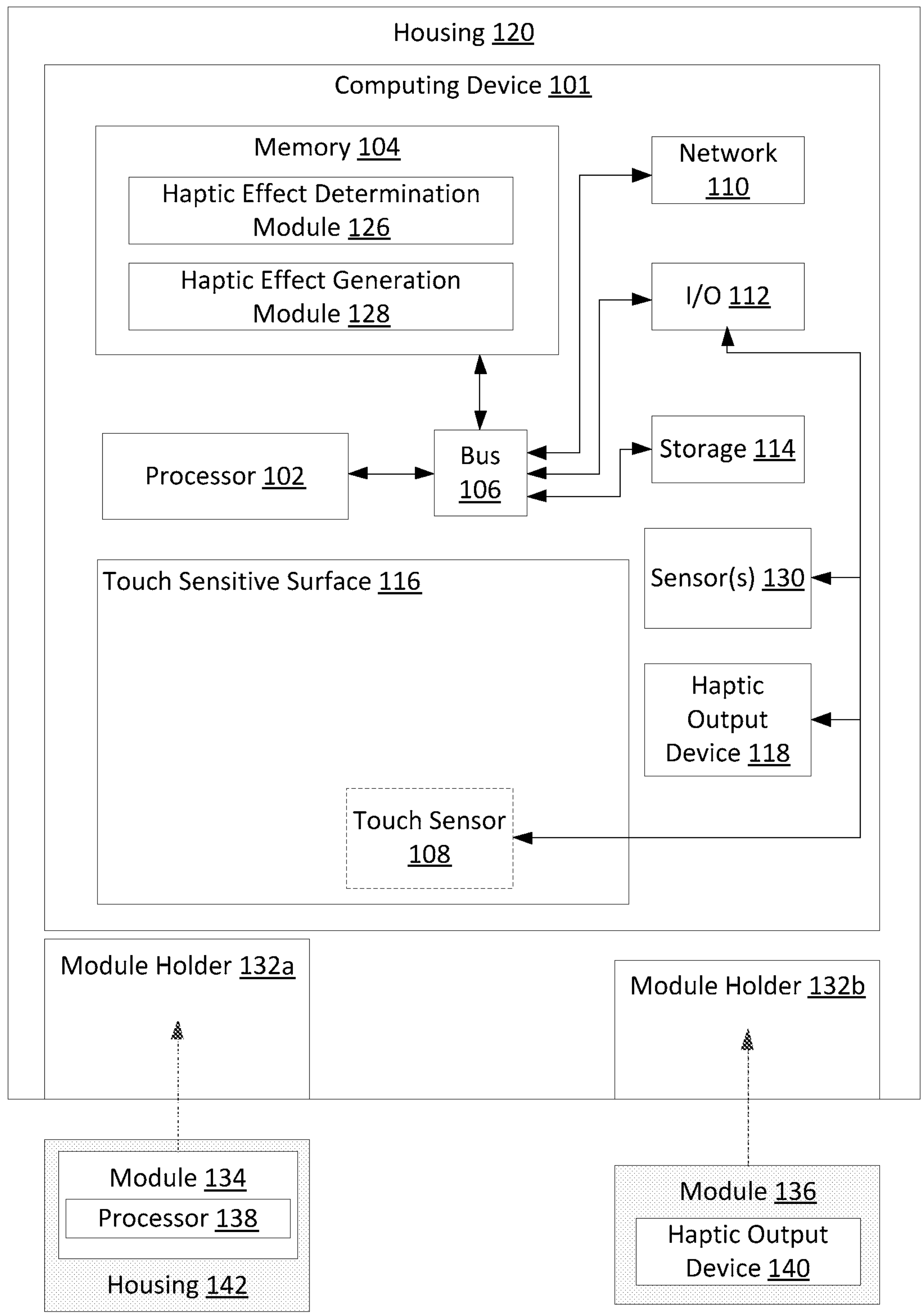
FIG. 1 is a block diagram showing a system for haptic feedback for modular devices.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations that come within the scope of the appended claims and their equivalents.

Illustrative Examples of Haptic Feedback for Modular Devices

One illustrative embodiment of the present disclosure comprises a computing device, such as a tablet, e-reader, or mobile phone (e.g., a smart phone). The computing device comprises a touch-screen display, a memory, and a processor in communication with each of these elements.

In the illustrative embodiment, the computing device is modular. A modular computing device may comprise an outer housing with one or more module holders configured to couple (e.g., mechanically and electrically) with one or more external modules. For example, in some embodiments, the computing device comprises an outer housing with a plurality of slots for receiving and coupling with one or more external modules. A module, as used herein, is a physical device comprising hardware (e.g., a sensor, haptic output device, processor, memory, network interface device, and/or user input device) and/or software configured to provide the computing device with particular functionality. For example, a module may provide the computing device with sensor input; the ability to output haptic feedback, visual feedback, and/or auditory feedback; an amount of processing power, memory, and/or storage; and/or instructions executable by a processor to cause the processor to perform a particular function. In some embodiments, a user can connect, remove, and replace modules and/or the modules may be interchangeable. This may allow the user to easily customize the functionality of the computing device.

In the illustrative embodiment, a haptic feedback module is coupled to the computing device. For example, the haptic feedback module may be coupled to the exterior of the outer housing of the computing device. In the illustrative embodiment, the haptic feedback module comprises one or more haptic feedback devices (e.g., a voice coil, a shape memory alloy, a piezoelectric device, a solenoid, an eccentric rotating mass motor, and/or a linear resonant actuator). In some embodiments, the haptic feedback module may provide the computing device with the ability to output particular haptic effects (e.g., textures, vibrations, stroking sensations, stinging sensations, and/or changes in perceived coefficient of friction). For example, the computing device may be unable to output haptic effects independently and may rely on the haptic feedback module to output haptic effects. In other embodiments, the haptic feedback module may provide the computing device with the ability to output additional, different, customizable, and/or more precise haptic effects.

In the illustrative embodiment, the computing device is configured to generate and transmit one or more actuator signals to the haptic feedback module upon the occurrence of an event. For example, the computing device may detect a user interacting with (e.g., tapping, touching, or gesturing on) a virtual object (e.g., a slider, button, or widget) displayed on the touch-screen display. In some embodiments, the computing device may generate and transmit one or more actuator signals to the haptic feedback module based on the user interaction. The haptic feedback module is configured to receive the actuator signals and output one or more haptic effects.

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Haptic Feedback for Modular Devices

FIG. 1 is a block diagram showing a system for haptic feedback for modular devices according to one embodiment. The system comprises a computing device 101. In some embodiments, the computing device 101 may comprise a mobile phone (e.g., a smartphone), portable media player (e.g., a MP3 player), tablet, e-reader, laptop computer, and/or a portable gaming device. In some embodiments, the components (e.g., the processor 102, network interface device 110, sensor 130, and haptic output device 118) of the computing device 101 may be integrated into a single housing 120. In other embodiments, the components may be distributed (e.g., among multiple housings or locations) and in electrical communication with one another.

The computing device 101 comprises a housing 120 (e.g., an outer housing). The housing 120 may comprise one or more module holders 132*a-b* configured to receive and/or couple to one or more external modules 134 or 136 (e.g., a housing 142 of a module 134). As described in greater detail with respect to FIG. 4, the module holders 132*a-b* may comprise one or more couplers configured to mechanically and/or electrically couple the modules 134 or 136 to the computing device 101. Examples of the couplers may comprise magnets, snap-in components, screws, latches, bolts, wires, straps, an adhesive, and/or locking devices. For example, the module holder 132*a* may comprise a coupler comprising an electromagnet. The electromagnet may be configured to apply magnetic forces to a metal component of module 134. This may mechanically couple the module 134 to the module holder 132*a*. Additionally or alternatively, the coupler may be electrically connected to a component of the computing device 101, such as the bus 106 or the I/O interface 112, to electrically couple (e.g., provide electrical communication between) the module 134 and the computing device 101.

In some embodiments, the couplers comprise covers configured to snap or close into place over top of the modules 134 or 136. This may hold the modules 134 or 136 in position against the computing device 101. In other embodiments, the couplers comprise a suction device (e.g., a pump) for generating a suction between the modules 134 or 136 and the computing device 101, e.g., to keep the modules 134 or 136 in place. In still other embodiments, the couplers comprise one or more gears or wheels configured to rotate along one or more tracks. The track(s) may be coupled to a module 134 or 136. For example, module 134 may comprise a first track coupled to one side of the module 134 and a second track coupled to an opposite side of the module 134. In such an embodiment, the gears or wheels may rotate in a first direction to draw a module 134 or 136 toward the computing device 101 and/or secure the module 134 or 136 in place. The gears or wheels may rotate in the opposite direction to push the module 134 or 136 away from the computing device 101 and/or release the module 134 or 136 from the computing device 101.

In some embodiments, the computing device 101 may or may not comprise all of the components depicted in FIG. 1. For example, in some embodiments, the computing device 101 is configured to have limited functionality, e.g., so that a user can customize and/or expand on the functionality by attaching one or more external modules 134 or 136. In one such embodiment, the computing device 101 may not comprise the sensors 130 and/or the network interface devices 110. A user may attach one or more modules 134 or 136 to provide such functionality to the computing device 101. In another embodiment, the computing device 101 may not comprise the processor 102 and/or the haptic output device 118. A user may attach a module 134 comprising a processor 138 and/or a module 136 comprising a haptic output device 140 to provide the computing device 101 with processing and haptic feedback functionality, respectively.

The system may comprise any number or configuration of processors. The processors can be distributed among the computing device 101 and/or any number of modules 134 or 136. For example, the computing device 101 may comprise a processor 102 and a module 134 may comprise a processor 138. In some embodiments, the processors 102 and 138 may work in conjunction to process data or execute functions. For example, the processors 102 or 138 may process data in parallel. In other embodiments, the processors 102 and 138 may work independently to process data or execute functions. Some or all of the components of the system (e.g., touch sensitive surface 116, haptic output device 118, and sensors 130) may be in communication with the processors 102 or 138. The components may transmit signals to, and receive signals from, the processors 102 or 138.

In the embodiment shown in FIG. 1, the computing device 101 comprises a processor 102 interfaced with other hardware via bus 106. A memory 104, which can comprise any suitable tangible (and non-transitory) computer-readable medium such as RAM, ROM, EEPROM, or the like, may embody program components that configure operation of the computing device 101. In some embodiments, the computing device 101 may further comprise one or more network interface devices 110, input/output (I/O) interface components 112, and additional storage 114.

Network interface device 110 can represent one or more of any components that facilitate a network connection or otherwise facilitate communication between devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

I/O components 112 may be used to facilitate connection to devices such as one or more displays, touch sensitive surfaces 116, keyboards, mice, speakers, microphones, buttons, and/or other hardware used to input data or output data. Storage 114 represents nonvolatile storage such as read-only memory, flash memory, ferroelectric RAM (F-RAM), magnetic, optical, or other storage media included in the computing device 101 or coupled to processor 102.

The computing device 101 may further comprise one or more sensor(s) 130. The sensor(s) 130 are configured to transmit sensor signals to a processor 102 internal to computing device 101 and/or a processor 138 enclosed within a module 134. In some embodiments, the sensor 130 may comprise, for example, a humidity sensor, ambient light sensor, gyroscope, GPS unit, accelerometer, range sensor, depth sensor, biosensor, camera, and/or temperature sensor. In some embodiments, the sensor 130 may be external to computing device 101 and in wired or wireless communication with the computing device 101. For example, the sensor 130 may comprise a biosensor configured to be worn by a user. The sensor 130 may wirelessly transmit signals associated with a physiological status of the user to a processor 102 or 138. In some embodiments, a processor 102 or 138 may analyze the sensor signals to determine whether to output a haptic effect (e.g., via haptic output device 118 and/or haptic output device 140).

The system further includes a touch sensitive surface 116, which, in this example, is integrated into computing device 101. Touch sensitive surface 116 represents any surface that is configured to sense tactile input of a user. One or more touch sensors 108 are configured to detect a touch in a touch area when an object contacts a touch sensitive surface 116 and provide appropriate data for use by processor 102. Any suitable number, type, or arrangement of sensors can be used. For example, resistive and/or capacitive sensors may be embedded in touch sensitive surface 116 and used to determine the location of a touch and other information, such as pressure, speed, and/or direction. As another example, optical sensors with a view of the touch sensitive surface 116 may be used to determine the touch position.

In other embodiments, the touch sensor 108 may comprise a LED detector. For example, in one embodiment, touch sensitive surface 116 may comprise a LED finger detector mounted on the side of a display. In some embodiments, the processor 102 is in communication with a single touch sensor 108, in other embodiments, the processor 102 is in communication with a plurality of touch sensors 108, for example, a first touch-screen and a second touch screen. The touch sensor 108 is configured to detect user interaction, and based on the user interaction, transmit signals to a processor 102 or 138. In some embodiments, touch sensor 108 may be configured to detect multiple aspects of the user interaction. For example, touch sensor 108 may detect the speed and pressure of a user interaction, and incorporate this information into the interface signal.

Touch sensitive surface 116 may or may not comprise (or otherwise correspond to) the display, depending on the particular configuration of the system. Some embodiments include a touch enabled display that combines a touch sensitive surface 116 and a display of the device. The touch sensitive surface 116 may correspond to the display exterior or one or more layers of material above components shown on the display. Whether integrated with a display or otherwise, the depiction of planar touch sensitive surfaces 116 in the examples herein is not meant to be limiting. Other embodiments may comprise curved or irregular touch sensitive surfaces 116.

The system comprises haptic output devices 118 or 140. The haptic output devices 118 or 140 may be in communication with a processor 102 or 138. The haptic output devices 118 or 140 are configured to output a haptic effect in response to a haptic signal from a processor 102 or 138. In some embodiments, the haptic effect comprises a vibration, a change in a perceived coefficient of friction, a simulated texture, a change in temperature, a stroking sensation, an electro-tactile effect, or a surface deformation (e.g., a deformation of a surface associated with the computing device 101 or a module 134). Further, some haptic effects may use multiple haptic output devices 118 and 140 of the same or different types in sequence and/or in concert to produce haptic effects. For simplicity, the remainder of the description for FIG. 1 will refer to haptic output device 118. However, it will be appreciated that haptic output device 140 can function substantially the same as, and comprise substantially the same components as, the haptic output device 118.

In some embodiments, the haptic output device 118 is configured to output a haptic effect comprising a vibration. The haptic output device 118 may comprise, for example, one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In some embodiments, the haptic output device 118 is configured to output a haptic effect modulating the perceived coefficient of friction of a surface associated with the haptic output device 118. For example, the haptic output device 118 may output a haptic effect modulating the perceived coefficient of friction on a surface of the housing 142 of a module 134. As another example, the haptic output device 140 may output a haptic effect modulating the perceived coefficient of friction on the touch sensitive surface 116 and/or the housing 120. In one embodiment, the haptic output device 118 comprises an ultrasonic actuator. An ultrasonic actuator may vibrate at an ultrasonic frequency, for example 20 kHz, reducing the perceived coefficient of friction of an associated surface. In some embodiments, the ultrasonic actuator may comprise a piezo-electric material.

In some embodiments, the haptic output device 118 uses electrostatic attraction, for example by use of an electrostatic actuator, to output a haptic effect. The haptic effect may comprise a simulated texture, a simulated vibration, a stroking sensation, or a perceived change in a coefficient of friction on a surface associated with computing device 101 and/or a module 134 or 136. In some embodiments, the electrostatic actuator may comprise a conducting layer and an insulating layer. The conducting layer may be any semiconductor or other conductive material, such as copper, aluminum, gold, or silver. The insulating layer may be glass, plastic, polymer, or any other insulating material. Furthermore, a processor 102 or 138 may operate the electrostatic actuator by applying an electric signal, for example an AC signal, to the conducting layer. In some embodiments, a high-voltage amplifier may generate the AC signal. The electric signal may generate a capacitive coupling between the conducting layer and an object (e.g., a user's finger, head, foot, arm, shoulder, leg, or other body part, or a stylus) near or touching the haptic output device 118. Varying the levels of attraction between the object and the conducting layer can vary the haptic effect perceived by a user.

In some embodiments, the haptic output device 118 comprises a deformation device configured to output a deformation haptic effect. The deformation haptic effect may comprise raising or lowering portions of a surface associated with the computing device 101 and/or a module 134 or 146. For example, the haptic effect may comprise raising portions of the touch sensitive surface 116 to generate a bumpy texture. In some embodiments, the deformation haptic effect may comprise bending, folding, rolling, twisting, squeezing, flexing, changing the shape of, or otherwise deforming a surface associated with the computing device 101 and/or a module 134 or 146. In one such embodiment, the deformation haptic effect may apply a force on a surface associated with the computing device 101, which may be deformable. The force may cause the computing device 101 to bend, fold, roll, twist, squeeze, flex, change shape, or otherwise deform.

In some embodiments, the haptic output device 118 comprises fluid (e.g., a liquid or gas) configured for outputting a haptic effect (e.g., for bending or deforming a surface associated with the computing device 101 and/or a module 134 or 136). For example, the fluid may comprise a smart gel. A smart gel comprises a fluid with mechanical or structural properties that change in response to a stimulus or stimuli (e.g., an electric field, a magnetic field, temperature, ultraviolet light, shaking, or a pH variation). For instance, in response to a stimulus, a smart gel may change in stiffness, volume, transparency, and/or color. In some embodiments, stiffness may comprise the resistance of a surface associated with the computing device 101 and/or a module 134 or 136 against deformation. In some embodiments, one or more wires may be embedded in or coupled to the smart gel. As current runs through the wires, heat is emitted, causing the smart gel to expand or contract. This may move a surface associated with the computing device 101 and/or a module 134 or 136, generating the haptic effect.

As another example, the fluid may comprise a rheological (e.g., a magneto-rheological or electro-rheological) fluid. A rheological fluid comprises metal particles (e.g., iron particles) suspended in a fluid (e.g., oil or water). In response to an electric or magnetic field, the order of the molecules in the fluid may realign, changing the overall damping and/or viscosity of the fluid. This may move a surface associated with the computing device 101 and/or a module 134 or 136, generating a haptic effect.

In some embodiments, the haptic output device 118 comprises a mechanical deformation device. For example, in some embodiments, the haptic output device 118 may comprise an actuator coupled to an arm that rotates a deformation component. The deformation component may comprise, for example, an oval, starburst, or corrugated shape. The deformation component may be configured to move a surface associated with the computing device 101 and/or a module 134 or 136 at some rotation angles but not others. The actuator may comprise a piezo-electric actuator, rotating/linear actuator, solenoid, an electroactive polymer actuator, macro fiber composite (MFC) actuator, shape memory alloy (SMA) actuator, and/or other actuator. As the actuator rotates the deformation component, the deformation component may move the surface, causing it to deform. In such an embodiment, the deformation component may begin in a position in which the surface is flat. In response to receiving a signal from a processor 102 or 138, the actuator may rotate the deformation component. Rotating the deformation component may cause one or more portions of the surface to raise or lower. The deformation component may, in some embodiments, remain in this rotated state until the processor 102 or 138, signals the actuator to rotate the deformation component back to its original position.

Further, other techniques or methods can be used to output haptic effects. For example, the haptic output device 118 may comprise a flexible surface layer configured to deform its surface or vary its texture based upon contact from a surface-reconfigurable haptic substrate (including, but not limited to, e.g., fibers, nanotubes, electroactive polymers, piezoelectric elements, or shape memory alloys). In some embodiments, the haptic output device 118 outputs a haptic effect via a deforming mechanism (e.g., a motor coupled to wires), air or fluid pockets, local deformation of materials, particle jamming, electromagnets, shape-memory alloys, resonant mechanical elements, piezoelectric materials, micro-electromechanical systems ("MEMS") elements or pumps, thermal fluid pockets, variable porosity membranes, or laminar flow modulation.

In some embodiments, the haptic output device 118 may comprise a motor. For example, the haptic output device 118 may comprise a motor (e.g., a DC motor) configured to pull a wire or cable coupled to a portion of the computing device 101 and/or a module 134 or 136. This may cause the computing device 101 and/or a module 134 or 136 to bend or otherwise deform.

In some embodiments, the haptic output device 118 may be a portion of the housing 120 of the computing device 101. In other embodiments, the haptic output device 118 may be housed inside a flexible housing overlaying a surface associated with the computing device 101 (e.g., the front or back of the computing device 101). For example, the computing device 101 may comprise a layer of smart gel positioned over the touch sensitive surface 116. Upon actuating the haptic output device 118 (e.g., with an electric current or an electric field), the smart gel may expand and/or otherwise deform. This may cause the user to perceive a haptic effect comprising a deformation of the surface of the touch sensitive surface 116.

Turning to memory 104, modules 126 and 128 are depicted to show how a device can be configured in some embodiments to provide haptic feedback for modular devices. Although the memory 104 and its associated modules 126 and 128 are depicted internal to computing device 101, in some embodiments, the memory 104 and/or modules 126 or 128 may be an integrated component of (e.g., enclosed within) a module 134 or 136.

Haptic effect determination module 126 represents a program component that analyzes data to determine a haptic effect to generate. The haptic effect determination module 126 may comprise code that selects one or more haptic effects to output using one or more algorithms or lookup tables. In some embodiments, the haptic effect determination module 126 comprises one or more algorithms or lookup tables useable by a processor 102 or 138 to determine a haptic effect.

In some embodiments, the haptic effect determination module 126 comprises code that determines a haptic effect based on an event. An event, as used herein, is any interaction, action, collision, or other event which occurs during operation of the computing device 101 which can potentially comprise an associated haptic effect. In some embodiments, an event may comprise user input (e.g., a button press, manipulating a joystick, interacting with a touch sensitive surface, tilting or orienting the device), a system status (e.g., low battery, low memory, or a system notification, such as a notification generated based on the system receiving an incoming phone call), sending data, receiving data, or a program event (e.g., if the program is a game, a program event may comprise explosions, gunshots, collisions, interactions between game characters, advancing to a new level, or driving over bumpy terrain).

For example, in some embodiments, the processor 102 or 138 may receive a sensor signal associated with an event that occurred on the computing device 101. The event may comprise, for example, the computing device 101 receiving an incoming phone call. Based on the event, the haptic effect determination module 126 may determine a haptic effect comprising, e.g., a vibration. This may physically notify a user of the incoming call, which may be beneficial, for example, if the user has the phone's ringer on silent.

In some embodiments, haptic effect determination module 126 comprises code that determines a haptic effect based on a characteristic (e.g., the type, pressure, speed, location, or direction) of a user interaction with the computing device 101. For example, the haptic effect determination module 126 may determine a haptic effect comprising a pulsed vibration if the user interacts with the touch sensitive surface 116 (e.g., touch-screen display) of the computing device 101 at a particular location (e.g., a location associated with a virtual object, such as a button, slider, knob, switch, image, text, or widget). As another example, the haptic effect determination module 126 may determine a haptic effect comprising a long vibration based on a user pressing a physical button on the computing device 101.

In some embodiments, the haptic effect determination module 126 comprises code that determines a haptic effect based on a characteristic (e.g., size, shape, location, texture, color, type, or content) of a virtual object. For example, the computing device 101 may be executing a video game. In some embodiments, the processor 102 or 138 may detect a user interaction with a virtual object (e.g., a virtual weapon) and determine a haptic effect based on a characteristic of the virtual object. For example, in the video game embodiment described above, the haptic effect determination module 126 may determine a haptic effect comprising a high-magnitude vibration if the virtual object is a rocket launcher. Further, in such an embodiment, if the virtual object is a knife, the haptic effect determination module 126 may determine a haptic effect comprising low-magnitude vibration. The different haptic effects may be indicative of the power or force associated with the virtual object (e.g., the virtual weapon).

Haptic effect generation module 128 represents programming that causes processor 102 to generate and transmit haptic signals to a haptic output device 118 or 140 to generate the selected haptic effect. For example, the haptic effect generation module 128 may access stored waveforms or commands to send to the haptic output device 118 to create the desired effect. In some embodiments, the haptic effect generation module 128 may comprise algorithms to determine the haptic signal. Further, in some embodiments, haptic effect generation module 128 may comprise algorithms to determine target coordinates for the haptic effect (e.g., coordinates for a location on the touch sensitive surface 116 at which to output a haptic effect).

Although the modules 126 and 128 are depicted in FIG. 1 as program components within the memory 104, in some embodiments, module 126 or 128 may comprise hardware. For example, module 126 or 128 may comprise analog to digital converters, processors, microcontrollers, comparators, amplifiers, transistors, and other analog or digital circuitry.

Figure 2:
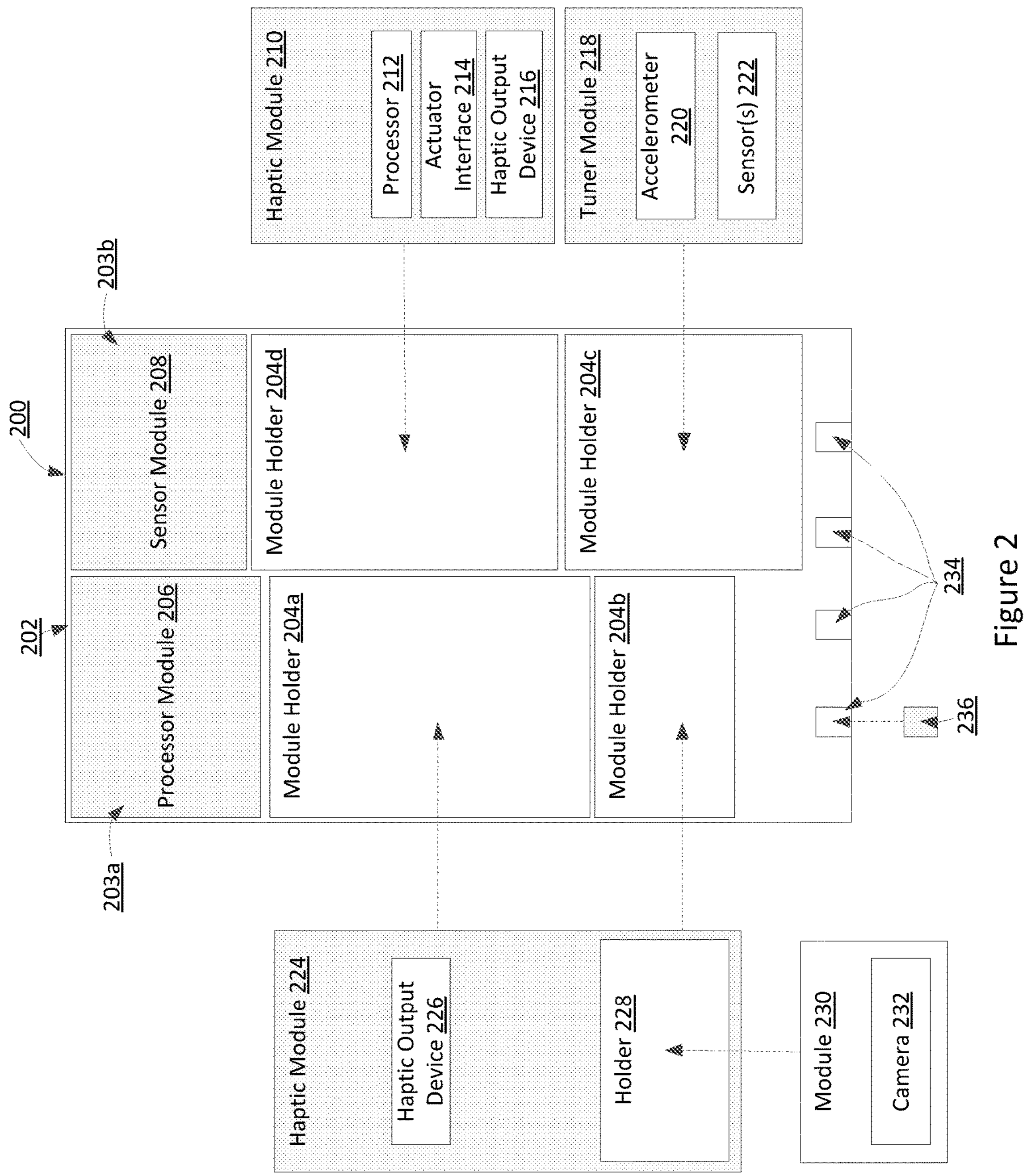
FIG. 2 shows an embodiment of a system for haptic feedback for modular devices.

FIG. 2 is an embodiment of a system for haptic feedback for modular devices. The system comprises a modular computing device 200 (e.g., a back view of the computing device 200). The computing device 200 may comprise, for example, a mobile device (e.g., a tablet, mobile phone, or e-reader). A user can interact with the computing device 200 (e.g., via a touch sensitive display or other user interface component, such as a button, directional pad, joystick, and/or switch) to perform various tasks (e.g., check e-mail, browse webpages, play music, watch videos, receive phone calls, or play a video game) using the computing device 200.

The computing device 200 comprises an outer housing 202 configured to removably couple with one or more modules (e.g., modules 206, 208, 210, 218, or 224). In some embodiments, the computing device 200 comprises one or more empty module holders 204*a-d* and/or one or more filled module holders 203*a-b*. The module holders 203*a-b*, 204*a-d* may be configured to couple with any number, shape, type, and configuration of modules. For example, the filled module holders 203*a-b* may comprise a processor module 206 and a sensor module 208.

In some embodiments, the processor module 206 comprises a processor configured to provide processing power to the computing device 200. The computing device 200 can process data and/or execute one or more functions using the processor module 206. In some embodiments, the computing device 200 can process data using the processor module 206 in conjunction with or alternatively to another processor (e.g., a processor that is internal to the computing device 200 and/or to a processor enclosed within another module, such as haptic module 210). This may allow the computing device 200 to process data with faster speed, e.g., by using a faster processor (e.g., associated with the processor module 206) and/or by processing data in parallel using multiple processors. For simplicity, the remainder of the description of FIG. 2 will reference processor 212. However, any of the functions or embodiments described below may additionally or alternatively use another processor enclosed within the computing device 200 and/or other modules 208, 210, 218, or 224.

In some embodiments, the sensor module 208 comprises one or more sensors configured to detect a characteristic of the computing device (e.g., an orientation, speed, and direction of movement) and/or the environment (e.g., a temperature, pressure, and an ambient light). The sensor module 208 is configured to transmit sensor signals associated with the characteristic to a processor 212. For example, the computing device 200 may execute a virtual tennis video game. In some embodiments, the computing device 200 may receive from a sensor module 208 (e.g., via an accelerometer and/or gyroscope) sensor signals associated a user moving the computing device 200 with a particular speed and direction. Based on the sensor signals, the computing device 200 may, for example, cause a virtual racket to hit an inbound tennis ball. In this manner, the computing device 200 can receive and use one or more sensor signals from the sensor module 208 to execute functions and/or perform operations.

The system may also comprise one or more other modules 210, 218, or 224. In some embodiments, the other modules 210, 218, or 224 can couple with (e.g., be inserted into) the empty module holders 204*a-d*. For example, the system may comprise a haptic module 210. In some embodiments, the haptic module 210 comprises a processor 212, an actuator interface 214, memory, and/or a haptic output device 216. The memory may comprise instructions (e.g., TouchSense® software from Immersion Corporation) executable by a processor 212 to cause the computing device 200 to generate one or more haptic effects. In some embodiments, the haptic output device 216 may comprise any number, type, and configuration of haptic output devices (e.g., any or all of the haptic output devices described above with respect to the haptic output device 118 of FIG. 1) configured to output any number, type, and configuration of haptic effects. The haptic effect may comprise one or more textures, vibrations, stroking sensations, stinging sensations, and changes in perceived coefficient of friction.

In some embodiments, the processor 212 detects the occurrence of an event and transmits an associated actuator signal to the haptic output device 216. For example, the processor may detect an explosion in a video game and transmit an associated actuator signal to the haptic output device 216. The actuator signal may be configured to cause the haptic output device 216 to output, e.g., a high-magnitude vibration. In some embodiments, the high-magnitude vibration may simulate the explosion.

In other embodiments, the processor 212 detects the occurrence of an event and transmits a signal associated with the event to the actuator interface 214. The actuator interface 214 may amplify and otherwise manipulate (e.g., filter, invert, and modulate) the signal to generate an actuator signal. For example, the actuator interface 214 may comprise one or more amplifiers, transistors, comparators, inverters, filters, digital-to-analog converters, and analog-to-digital converters configured to manipulate the signal to generate the actuator signal. In some embodiments, the actuator interface 214 transmits the actuator signal to the haptic output device 216. The haptic output device 216 can receive the actuator signal and output a haptic effect, e.g., comprising a high-magnitude vibration.

In some embodiments, the system comprises a tuning module 218. The tuning module 218 may provide feedback to a processor 212 about the characteristics of a haptic effect output by the computing device 200 (e.g., haptic output device 216). For example, upon a gunshot occurring in a video game, the computing device 200 may output a haptic effect, e.g., comprising a vibration. The tuning module 218 (e.g., via accelerometer 220) may detect characteristics of the haptic effect (e.g., the magnitude, frequency, and duration of vibrations) and transmit a signal associated with the characteristics to a processor. In some embodiments, the processor 212 may modify a characteristic of the haptic effect based on the signal. For example, the processor 212 may determine, based on the signal, that more or less power should be supplied to the haptic output device, e.g., to increase the magnitude of vibrations perceived by the user.

In some embodiments, the tuning module 218 additionally or alternatively comprises other sensors 222. For example, the tuning module 218 may comprise a microphone. The microphone may be configured to detect vibrations and/or noises output by a haptic output device (e.g., haptic output device 216) and transmit an associated sensor signal to the processor 212. In some embodiments, the processor 212 may determine, based on the sensor signal, that the haptic output device is too loud (e.g., if the haptic output device comprises an ERM spinning at a high rate of speed), not loud enough (e.g., if the haptic output device is also configured to output audio feedback), is generating vibrations with too large a magnitude, and/or is generating vibrations with too small a magnitude. In some embodiments, the processor 212 may counteract any of the above issues by modifying, for example, one or more characteristics of an actuator signal transmitted to the haptic output device. For instance, the processor 212 may reduce the amplitude of the actuator signal, e.g., to reduce an amount of noise generated by the haptic output device. This may be advantageous, for example, if a user is using the computing device 200 in a quiet setting, such as a movie theater.

In some embodiments, the tuning module 218 may be configured to detect an amount of voltage and/or current being transmitted to a haptic output device (e.g., to generate a haptic effect). The tuning module 218 may then transmit a signal associated with the measured voltage and/or current to the processor 212. In some embodiments, the processor 212 may modify one or more characteristics of the haptic effect based on the signal. For example, the computing device 200 may detect a user interaction with a virtual button output on a touch-screen display. The computing device 200 may responsively output a haptic effect comprising, e.g., a simulated texture, via a haptic output device. In some embodiments, the tuning module 218 measures (e.g., via an ammeter) the amount of current transmitted to the haptic output device to generate the haptic effect. Based on the signal, the processor 212 may determine, for example, that the computing device 200 is transmitting too little current to output the desired haptic effect (e.g., a perceivable texture). In some embodiments, the processor 212 may output a new haptic effect (e.g., a vibration) and/or cause more current to be supplied to the haptic output device to generate the desired haptic effect (e.g., the texture). Thus, the tuning module 218 can provide feedback to a processor 212 to aid the processor 212 in selecting and/or tuning the characteristics of haptic effects.

In some embodiments, a module can be configured to take up multiple module holders 204*a-b* (e.g., when coupled to the computing device 200). For example, the haptic module 224 may be configured to simultaneously couple with two module holders 204*a-b* on the computing device 200. As discussed above, the computing device 200 can be configured to receive any arrangement, type, shape, and configuration of modules 206, 208, 210, 218, and 224.

In some embodiments, the haptic module 224 comprises a haptic output device 226. The haptic output device 226 may generate haptic effects by moving an object (e.g., by rotating, vibrating, or otherwise moving the object). In some embodiments, the haptic output device 226 may use an object internal to the haptic module 224 to generate haptic effects. For example, the haptic output device 226 may comprise an ERM. In other embodiments, the haptic output device 226 couples to and moves an object external to the haptic module 224 to generate haptic effects. For example, the haptic module 224 may comprise a holder 228 configured to removably couple with another module 230, battery, and/or any other external object. In some embodiments, the module 230 may comprise, for example, a camera 232 and/or other components accessible by the computing device 200 via the haptic module 224. The haptic output device 226 may generate haptic effects by moving (e.g., vibrating) the external object. In some embodiments, a user may customize the haptic effects output by the haptic output device 226, e.g., by replacing the module 230 with another object. For example, the user may replace the module 230 with another module that has less mass. This may cause the haptic output device 226 to generate vibrations with smaller magnitudes.

In some embodiments, the haptic module 224 may be configured to tune haptic effects output by the haptic module 224 based on one or more characteristics (e.g., the mass) of the external object. For example, in some embodiments, the haptic module 224 may output one or more haptic effects by transmitting known amounts of power to a device (e.g., a motor) configured to move (e.g., vibrate) the external object. The haptic module 224 may comprise a sensor (e.g., accelerometer) configured to detect a characteristic of the movement of the external object (e.g., the acceleration) and transmit associated sensor signals to the processor 212. In some embodiments, the processor 212 may determine the mass of the external object based on the sensor signals. For example, the processor 212 may determine the mass based on the acceleration measurements and the known amounts of power used to move the external object.

As another example, in some embodiments, the haptic module 224 may communicate with the external object, e.g., to receive data associated with the external object. For example, the haptic module 224 may electrically communicate with an external object comprising the module 230 to determine a type, mass, size, weight, or other characteristic of the external object. In one such embodiment, the haptic module 224 may communicate with the external object to determine a first characteristic of the external object (e.g., a type of the external object). The haptic module 224 may access a lookup table stored in memory to determine, based in part on the first characteristic, one or more other characteristics of the external object, such as its mass. In some embodiments, the processor 212 may modify one or more characteristics of a haptic effect based on the characteristics (e.g., mass or type) of the external object. Thus, the haptic module 224 can provide feedback to a processor 212 to aid the processor 212 in selecting and/or tuning the characteristics of haptic effects.

As shown in FIG. 2, the system may comprise a plurality of haptic modules 210, 224. For example, the computing device 200 may comprise a haptic module 224 coupled to the left side of the computing device 200 and a haptic module 210 coupled to the right side of the computing device 200. In some embodiments, the processor 212 uses one or more of the haptic modules 210 or 224 (and/or haptic output devices enclosed within the computing device 200) to output haptic effects. For example, the computing device 200 may output a virtual user interface on a touch-screen display. In some embodiments, the computing device 200 may detect a user interaction with a virtual object (e.g., a virtual rocket launcher) on a touch-screen display and output a haptic effect using, e.g., one or more of the haptic modules 210 or 224. For example, the computing device 200 may output a haptic effect comprising a high-magnitude vibration by actuating both haptic module 210 and haptic module 224 (e.g., which may comprise vibratory haptic output devices).

In some embodiments, the processor 212 may actuate different haptic output devices (e.g., haptic output devices 216 or 226) to output different types of haptic effects and/or haptic effects at different locations in the housing 202. In such an embodiment, the processor 212 may determine the location in the housing 202 of, and/or the functions of, one or more connected modules (e.g., modules 206, 208, 210, 218, or 224). For example, each module may communicate data comprising a position and/or function of the module to the processor 212, e.g., upon coupling with the computing device 200. In some embodiments, the processor 212 may actuate one or more haptic output devices based on the data.

For example, in one embodiment, if the processor 212 detects a user interaction with the left side of the touch-screen display, the processor 212 may output a haptic effect (e.g., a vibration) via a haptic output device on the left side of the computing device 200 (e.g., haptic output device 226). If the processor 212 detects a user interaction with the right side of the touch-screen display, the processor 212 may output another haptic effect (e.g., a simulated texture) via a haptic output device on the right side of the computing device 200 (e.g., haptic output device 216). Thus, the processor 212 may cause haptic effects to be output in locations corresponding to user interactions with the touch-screen display. As another example, the processor 212 may determine that haptic output device 226 renders high definition haptic effects, while haptic output device 216 may render low definition haptic effects. Thus, the processor 212 may only use haptic output device 226 to output haptic effects, or may use haptic output device 226 to output particular types of haptic effects (e.g., those that are improved using high-definition haptic output devices).

In some embodiments, the processor 212 may use a plurality of haptic output devices 216 and 226 to generate localized haptic effects. Localized haptic effects may comprise haptic effects that are primarily perceivable by a user when the user contacts a particular location on the computing device 200. For example, the computing device 200 may be coupled to six haptic modules 210 positioned in locations corresponding to the filled module holders 203*a-b* and empty module holders 204*a-d*. Upon an event occurring, the processor 212 may output a haptic effect via a particular haptic module 224. In some embodiments, because of a material (e.g., rubber) within the housing 202 and/or the haptic module 224, haptic forces may be unable to propagate through the housing 202 and/or haptic module 224 (described in greater detail below). In such an embodiment, a user may perceive the haptic effect if the user is contacting an area of the computing device 200 on or near the particular haptic module 224. The user may be unable to perceive the haptic effect while contacting other areas of the computing device 200.

In some embodiments, the housing 202 of the computing device 200 and/or the haptic module 210 or 224 may comprise a compliant material (e.g., rubber). The compliant material may be configured to modify the magnitude of haptic forces propagating through the housing 202 and/or the haptic module 210 or 224. In some embodiments, this may allow the computing device 200 to output haptic effects that are localized to a particular area of the computing device 200 (e.g., such as to a particular area on a touch-screen display). For example, the computing device 200 may output a virtual user interface via a touch-screen display. In some embodiments, the computing device 200 may detect a user interaction with a left side of the touch-screen display and output a haptic effect via the haptic module 224. In one embodiment, the compliant material may prevent the haptic forces from propagating through the housing 202. Thus, the haptic effect may not be perceivable by the user, for example, through the right side of the computing device 200 (or more specifically, the right side of the touch-screen display).

In some embodiments, the compliant material is configured to amplify the magnitude of haptic forces propagating through the housing 202 and/or the haptic module 210 or 224. For example, the computing device 200 may output a virtual user interface via a touch-screen display. In some embodiments, the computing device 200 may detect a user interaction with a right side of the touch-screen display and output a haptic effect via the haptic module 210. In one embodiment, the compliant material may amplify the haptic forces as they propagate through the housing 202. This may allow the user to perceive substantially the same haptic effect, regardless of where the user contacts the computing device 200 at a location close to or far from the haptic module 210.

In some embodiments, a processor 212 can adjust the characteristics of the compliant material, e.g., to modulate the characteristics of a haptic effect perceived by a user. For example, the compliant material may comprise a SMA, a magneto-rheological fluid, electro-rheological fluid, and/or a smart gel. In some embodiments, the processor 212 causes heat, a magnetic field, an electric field, and/or power to be applied to the compliant material to cause the compliant material to change its physical state (e.g., to make the compliant material more rigid or flexible). This may change the characteristic of a haptic effect perceived by a user. For example, the computing device 200 may detect a user input (e.g., a button press) and determine a haptic effect comprising a vibration. In some embodiments, the haptic effect is configured to confirm to the user that the computing device 200 registered the input and thus should be perceivable anywhere the user contacts the computing device 200. In such an embodiment, the computing device 200 may apply a magnetic field to a compliant material comprising a magneto-rheological fluid. The magnetic field may cause the compliant material to, e.g., become rigid and allow the haptic forces to propagate with minimal attenuation through the housing 202. In some embodiments, this may allow the user to perceive the haptic effect, regardless of where the user contacts the housing 202.

In some embodiments, the rigidity (or flexibility) of the housing 202 is configurable by a user. For example, the housing 202 may comprise one or more holders 234 configured to receive metal pins 236, masses, compliant materials, and/or other devices configured to affect the rigidity of the housing. In some embodiments, this may affect haptic forces propagating through the housing. For example, a user may insert a plurality of metal pins 236 into holders 234 (e.g., slots) in the housing 202. This may make the housing 202 more rigid. In some embodiments, increased rigidity may improve the transmission of haptic forces through the housing 202. In other embodiments, a user may insert a plurality of rubber blocks into the holders 234. This may dampen haptic forces propagating through the housing 202. Thus, in some embodiments a user can customize the characteristics of haptic effects by configuring the rigidity of the housing 202. Although the holders 234 are depicted on the bottom of the computing device 200 in FIG. 2, any sized holders 234 can be positioned in any number of locations and with any configuration in the computing device 200.

Figure 3:
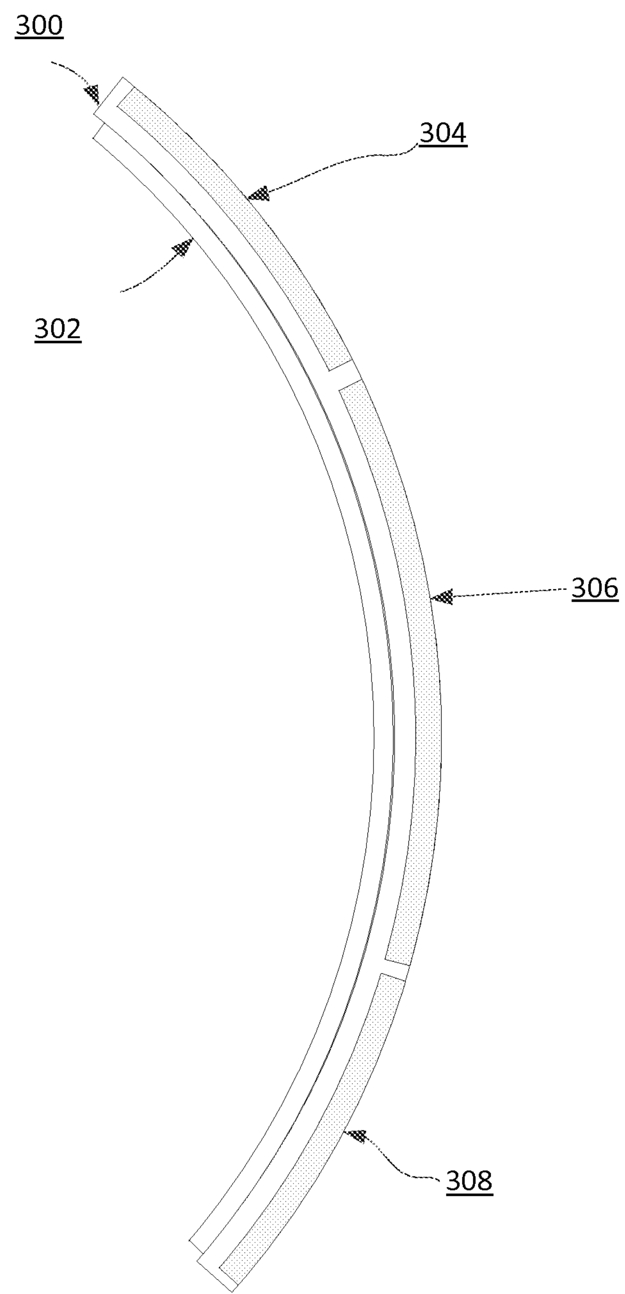
FIG. 3 shows another embodiment of a system for haptic feedback for modular devices.

FIG. 3 shows another embodiment of a system for haptic feedback for modular devices. The system comprises a modular computing device 300. In the embodiment shown in FIG. 3, the computing device 300 is deformable (e.g., bendable, squeezable, flexible, twistable, foldable, and/or rollable). In some embodiments, the computing device 300 comprises one or more hinges and/or flexures configured to allow the computing device 300 to deform. Multiple modules 304, 306, and 308 may be coupled to the computing device 300. In some embodiments, the modules are deformable.

In some embodiments, a touch-screen display 302 is coupled to the computing device 300. The touch-screen display 302 may be deformable and/or a module. For example, the touch-screen display 302 may be removably coupled to a module holder positioned on the front of the computing device 300. In some embodiments, the user can replace the touch-screen display 302 with another user interface device, such as a touch sensitive surface or a touch-screen display comprising a built-in haptic output device (e.g., an electrostatic haptic output device). This may allow the user to, for example, upgrade their device to a device capable of outputting haptic effects (or particular types of haptic effects) via the touch-screen display 302.

The computing device 300 may use one or more modules 304, 306, or 308 to output haptic effects. In some embodiments, a module 306 comprises a deformation haptic output device. For example, the module 306 may comprise a smart gel. In some embodiments, upon the occurrence of an event, a processor (e.g., internal to computing device 300) applies electricity and/or heat to the deformation haptic output device to cause the module 306 to deform. In some embodiments, deformation of the module 306 may cause the computing device 300 to deform (e.g., bend). The user may perceive the deformation as a haptic effect. For example, upon the computing device 300 outputting a virtual half pipe for a skateboarding video game via touch-screen display 302, a processor may apply electricity to the deformation haptic output device to cause the module 306 to bend. This may cause the computing device 300 to bend. In some embodiments, the bend may mimic the bend in the virtual half pipe. The user may perceive the bend as a haptic effect. In other embodiments, the deformation haptic output device may output a haptic effect configured to resist against a user deforming (e.g., bending) the computing device 300 and/or configured to unbend the computing device 300 from a bent state.

Figure 4:
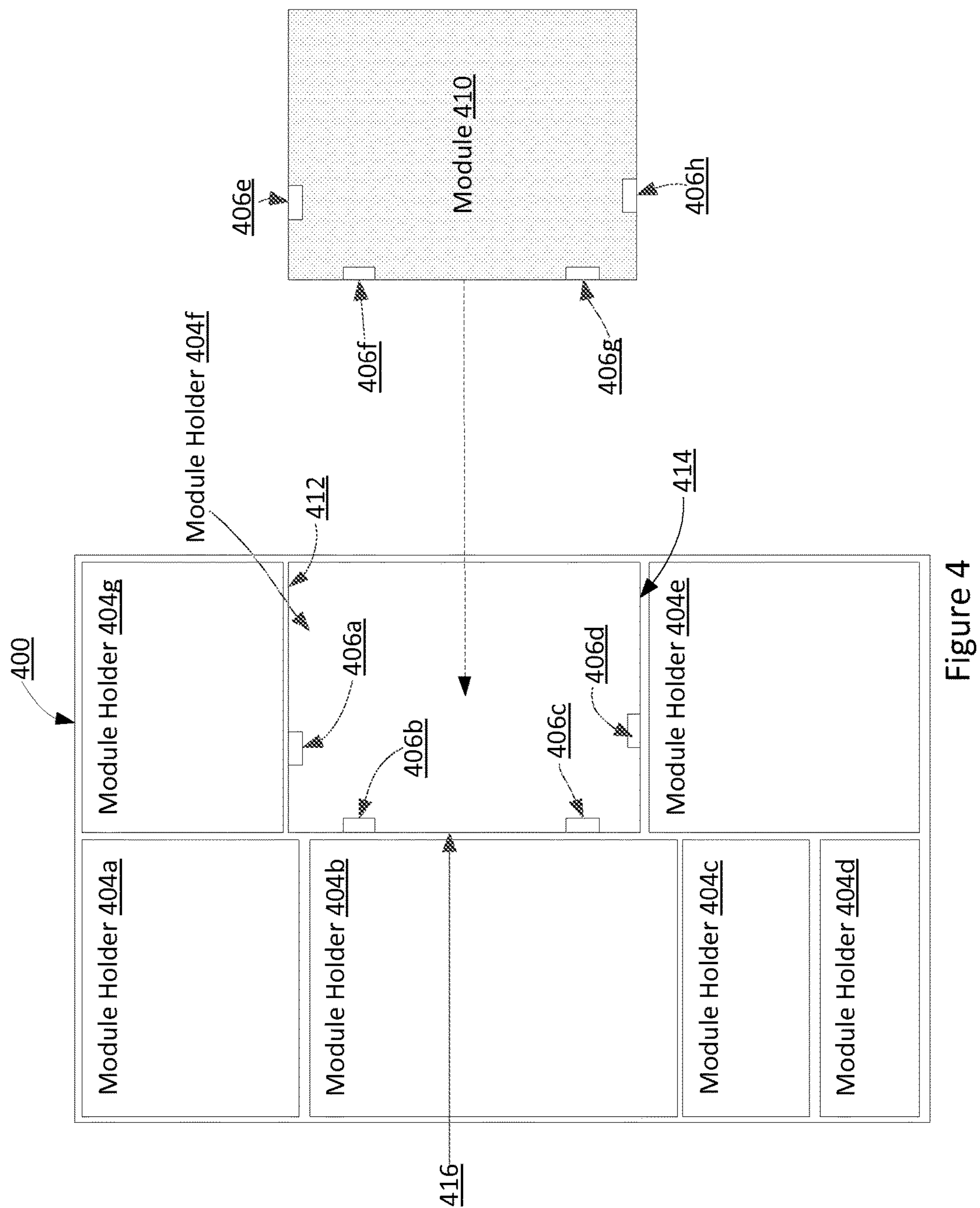
FIG. 4 shows still another embodiment of a system for haptic feedback for modular devices.

FIG. 4 shows still another embodiment of a system for haptic feedback for modular devices. In this embodiment, a modular computing device 400 comprises a plurality of module holders 404*a-f*. Each module holder 404*a-f* and/or module 410 may comprise one or more couplers 406*a-h* configured to mechanically and/or electrically couple a module 410 to the computing device 400. In some embodiments, the couplers 406*a-h* may comprise, for example, magnets, snap-in components, screws, springs, bolts, wires, straps, and/or locking devices. The computing device 400 and/or module 410 may comprise any number and configuration of couplers 406*a-h*.

In some embodiments, a processor (e.g., enclosed within computing device 400 or a module 410) may actuate one or more of the couplers 406*a-h* to output a haptic effect. For example, a processor may detect (e.g., via an ambient light sensor, pressure sensor, and/or other sensor coupled to a module holder 404*f* or a module 410) that a user is positioning a module 410 within a module holder 404*f*. In some embodiments, the processor responsively actuates one or more couplers 406*a-h* to output a haptic effect. For example, one or more of the couplers 406*a-h* may comprise an electromagnet. In some embodiments, the processor may actuate the electromagnet (e.g., by supplying power to the electromagnet) to generate magnetic forces between the couplers 406*a-h*. The magnetic forces may be configured to pull the module 410 into the module holder 404*f*. For example, the processor may actuate couplers 406*a-d* such that they have one magnetic polarity (e.g., positive polarity) and couplers 406*e-h* such that they have an opposite magnetic polarity (e.g., negative polarity). This may cause the couplers 406*a-d* and 406*e-h* to pull toward each other. The pulling magnetic forces may assist the user in inserting the module 410 into a module holder 404*f*. In some embodiments, the user may perceive the pulling sensation as a haptic effect.

In some embodiments, the processor actuates the couplers 406*a-h* to generate magnetic forces between the couplers 406*a-h* that are configured to push the module 410 away from the module holder 404*f*. For example, in one embodiment, the processor may determine that the module 410 is not compatible with the computing device 400 and/or is redundant. In such an embodiment, the processor may actuate couplers 406*a-d* such that they have the same magnetic polarity as couplers 406*e-h*. In some embodiments, this may cause the couplers 406*a-d* and 406*e-h* to push away from each other. This may resist against the user inserting the module 410 into the module holder 404*f*. In some embodiments, the haptic effect may provide information to the user, e.g., that the module 410 is not compatible with the computing device 400 and/or is redundant.

In some embodiments, the processor may actuate the couplers 406*a-h* to generate haptic effects comprising, e.g., vibrations and/or click sensations. For example, the processor may determine that the module 410 is in place within the module holder 404*f*. In some embodiments, the processor may responsively actuate one or more couplers 406*a-h* to output a haptic effect. For example, the processor may actuate one or more couplers 406*a-h* to rapidly generate a pushing magnetic force and then a pulling magnetic force on the module 410. The pushing magnetic force may push the module 410 away from a wall (e.g., the back wall 416) of the module holder 404*f*, and the pulling magnetic force may pull the module 410 into the wall, causing an impact. The impact may generate a haptic effect comprising, e.g., a click sensation or a vibration. In some embodiments, the processor may output such a haptic effect to, e.g., confirm to the user that the module 410 is in place.

As another example, the processor may generate a vibratory haptic effect, e.g., to confirm that the module 410 is in place. In some embodiments, the processor actuates one coupler 406*a* to pull the module 410 toward a top wall 412 of the module holder 404*f*. This may cause an impact between the module 410 and the top wall 412. The processor may rapidly actuate another coupler 406*d* to pull the module 410 toward a bottom wall 414 of the module holder 404*f*. This may generate an impact between the module 410 and the bottom wall 414. In some embodiments, the processor repeats this process, generating a plurality of back-and-forth impacts. The back-and-forth impacts may generate a haptic effect comprising, for example, a vibration.

In some embodiments, the processor actuates the couplers 406*a*, 406*d* using a particular amount of power and/or with a particular frequency to generate haptic effects with a particular magnitude and/or frequency. For example, the processor may actuate the couplers 406*a* and 406*d* using a large amount of power to generate large magnetic forces. The large magnetic forces may cause the module 410 to impact a wall of the module holder 404*f* with great force, which may generate a large magnitude haptic effect (e.g., vibration). In some embodiments, the haptic effect (e.g., vibration and/or click sensation) may be perceivable through the entire computing device 400. In other embodiments the haptic effect may only be perceivable while contacting the module 410 (e.g., if the housing of the computing device 400 comprises a compliant material configured to dampen haptic forces).

In some embodiments, a processor detects a position of a module 410 within a module holder 404*b* (e.g., via an ambient light sensor, pressure sensor, capacitive sensor, switch, or other sensor). The processor may further cause a haptic output device (e.g., enclosed within the computing device 400 and/or a module 410) to output a haptic effect based on the position. For example, the processor may detect a user pushing a module 410 into a module holder 404*f* (e.g., based on sensor signals from a mechanical switch, which the module 410 may interact with upon the user inserting the module 410 into the module holder 4040 and cause a haptic output device to output a haptic effect comprising, e.g., a vibration with an increasing magnitude. In some embodiments, the processor may increase the magnitude of the vibration as the user presses the module 410 further into the module holder 404*f*. Upon the module 410 being locked in place, the processor may cause a haptic output device to output another haptic effect, such as a click sensation. Thus, in some embodiments, a user may be able to determine the position of the module 410 in the module holder 404*f*, without looking at the computing device 400.

In some embodiments, a module 410 comprises a user interface device and/or is usable to provide input to the computing device 400 and/or another module. For example, the module 410 may comprise a button, joystick, touch sensitive surface, touch-screen display, directional pad, trigger, a microphone, and/or a camera. In some embodiments, a processor detects a user interaction with the user interface device and causes a haptic output device to output an associated haptic effect. For example, the module 410 may comprise a button (e.g., a capacitive button). In some embodiments, the processor detects a user interacting with (e.g., pressing) the button, e.g., to input data to the computing device 400. In such an embodiment, the processor may cause a haptic output device to output a haptic effect. For example, a user may interact with the button to, e.g., select a virtual object output on a display. The processor may detect the user interaction and actuate a plurality of couplers 406*a-d* to generate a haptic effect comprising, e.g., a vibration.

In some embodiments, the processor can modulate the strength of the coupling between one or more modules (e.g., module 410) and one or more module holders 404*a-f*. In such an embodiment, the processor may modulate the strength of the coupling to vary the characteristics of a haptic effect. For example, the module 410 may comprise a haptic output device, such as an ERM. Upon the occurrence of an event (e.g., a game event), the processor may use the module 410 to generate a haptic effect, e.g., a vibration. In some embodiments, the processor may be unable to directly control the magnitude of the haptic effect output by the haptic output device (e.g., such as if the haptic output device only has "on" and "off" modes). In such an embodiment, the processor may modify the amplitude of the haptic effect perceived by the user by actuating one or more couplers 406*a-h*, e.g., to strengthen or loosen the coupling between the module 410 and the module holder 404*f*.

For example, in some embodiments, the processor may actuate one or more couplers 406*a-h* to loosen the coupling between the module 410 and the module holder 404*f*. This may cause the module 410 to shake and impact the walls of the module holder 404*f* as the module 410 vibrates. In some embodiments, the impacts may reduce the amplitude of (e.g., dampen) the vibration perceived by the user. In other embodiments, the processor may actuate one or more couplers 406*a-h* to tighten the coupling between the module 410 and the module holder 404*f*. This may cause the module 410 to remain firmly in place as the module 410 vibrates. In some embodiments, this may allow haptic forces to propagate through the computing device 400, e.g., without dampening.

In some embodiments, the processor may modulate the strength of the coupling between a module 410 and a module holder 404*a-g* to counteract forces on the computing device 400 (e.g., from a user). For example, the processor may detect (e.g., via sensor signals from an accelerometer) a user shaking the computing device 400. In such an embodiment, the processor may actuate one or more couplers 406*a-h* to cause the couplers 406*a-h* to output strong magnetic fields. For example, the processor may actuate couplers 406*a-d* so that they have a strong positive polarity and couplers 406*e-h* so that they have a strong negative polarity. This may improve the coupling between a module 410 and a module holder 404*f*. In some embodiments, this may prevent the module 410 from coming loose, e.g., due to the shaking.

In some embodiments, the processor may modulate the strength of the coupling between a module 410 and a module holder 404*a-g* to, e.g., control how the computing device 410 feels to a user interacting with the computing device 410. In one such embodiment, the processor may tighten or loosen the coupling between a module 410 and a module holder 404*a-g* to provide information to the user, e.g., about a state of the computing device 410. For example, the processor may tighten the strength of the coupling between a module 410 and a module holder 404*a-g* if there are no notifications (e.g., e-mail, text message, phone call, low battery, or other notifications) for the user. The tightened coupling may cause the module 410 to remain firmly in place upon the user manipulating the computing device 410. In some embodiments, this may cause the user to perceive the computing device 410 as a single cohesive unit. This may indicate to the user that there are no notifications. As another example, the processor may loosen the strength of the coupling between one or more modules 410 and a respective module holder 404*a-g*, e.g., if there are notifications for the user. The loosened coupling may cause the one or more modules 410 to impact the walls of the module holder 404*f* as the user manipulates the computing device 410. This may generate a plurality of vibrations that are perceivable by the user as separate and/or individual haptic effects. In some embodiments, the plurality of vibrations may cause the user to perceive the computing device 410 as comprising multiple sub-units. This may indicate to the user that there are notifications available.

In some embodiments, the processor may tighten or loosen the coupling between a module 410 and a module holder 404*a-g*, e.g., to provide guidance information to the user. For example, the processor may execute a navigation application that provides directions to a location. The processor may determine that the user should make a right turn. In some embodiments, the processor may tighten the couplings between the modules and their respective module holders 404*a-d* on the left side of the computing device 400 and loosen the couplings between the modules 410 and their respective module holders 404*e-g* on the right side of the computing device 400. Upon a user interacting with (e.g., shaking) the computing device 400, the modules on the left side of the computing device 400 may remain firmly in place, and the modules on the right side of the computing device 400 may impact the walls of their respective module holders. The user may perceive the impacts on the right side of the computing device 400 and determine that, e.g., the user is supposed to turn right. In some embodiments, the processor may determine that the user should make a left turn. The processor may loosen the couplings between the modules and their respective module holders 404*a-d* on the left side of the computing device 400 and tighten the couplings between the modules 410 and their respective module holders 404*e-g* on the right side of the computing device 400. Upon the user interacting with the computing device 400, the user may perceive impacts on the left side of the computing device 500 and, e.g., determine that the user is supposed to turn left.

In some embodiments, the couplers 406*a-h* comprise a plurality of components. For example, the couplers 406*a-h* may comprise a spring and an electromagnet. In such an embodiment, the processor may actuate the couplers 406*b-c* to generate magnetic forces configured to pull the module 410 toward the back wall 416 of the module holder 404*f*. The movement of the module 410 toward the back wall 416 of the module holder 404*f* may compress the springs. In some embodiments, the processor may cause the couplers 406*b-c* to stop generating magnetic forces (or to apply magnetic forces with an opposite polarity). This may allow the compressed springs to release. The springs may push the module 410 in the opposite direction, e.g., away from the back wall 416 of the module holder 404*f*. In some embodiments, the user may perceive the movement of the module 410 as a haptic effect. In some embodiments, the processor may repeatedly apply electromagnetic forces to the module and remove the electromagnetic forces (or change the polarity of the magnetic forces), causing the spring to compress and expand. This can move the module 410 in a back-and-forth motion. This may generate, for example, a vibration or another haptic effect.

Figure 5A:
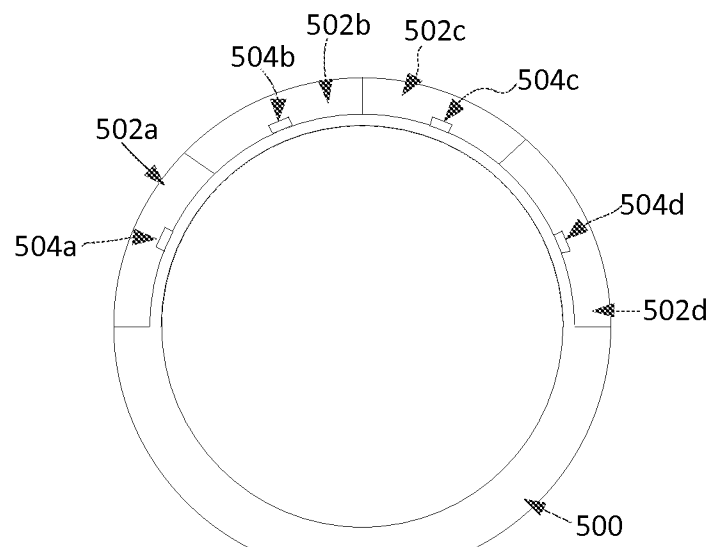
FIG. 5A shows yet another embodiment of a system for haptic feedback for modular devices.

FIG. 5A shows yet another embodiment of a system for haptic feedback for modular devices. The system comprises a modular computing device 500. In the embodiment shown in FIG. 5A, the computing device 500 is associated with a wearable device, particularly a bracelet. In other embodiments, the computing device 500 may be associated with another wearable device, such as a sleeve, jacket, glove, ring, watch, wristband, collar, shirt, article of clothing, hat, headband, jewelry, shoes, and/or glasses. The wearable device may be associated with a part of a user's body, for example, a user's finger, arm, hand, foot, leg, head, or other body part. In some embodiments, one or more modules 502*a-d* may be coupled to the computing device 500 via one or more couplers 504*a-d*. The computing device 500 and/or modules 502*a-d* can function and/or provide haptic effects using, for example, any of the methods described above with respect to FIGS. 1-4.

In some embodiments, the modular computing device 500 and/or the modules 502*a-d* may be distributed among a plurality of wearable devices. For example, a plurality of modules 502*a-d* may each be associated with a different wearable device configured to be worn by a user. The modules 502*a-d* may be in wired or wireless communication with each other and/or the modular computing device 500. For example, in one such embodiment, the system may comprise a processing module. The processing module may be coupled to a mobile device positioned, e.g., in a user's pocket. The system may additionally or alternatively comprise a speaker module. The speaker module may comprise an audio output device and may be positioned near a user's ear (e.g., to output sounds to the user). The system may additionally or alternatively comprise a microphone module. The microphone module may comprise an audio input device and may be positioned for receiving audio input from the user (e.g., near the user's mouth). The system may additionally or alternatively comprise a haptic module. The haptic module may be positioned anywhere on the user's body (e.g., the user's wrist, arm, hand, foot, shoulder, back, chest, finger, head, etc.) for outputting haptic effects to the user. Any number, combination, configuration, or placement of modules 502*a-d* on the user's body may be possible.

Figure 5B:
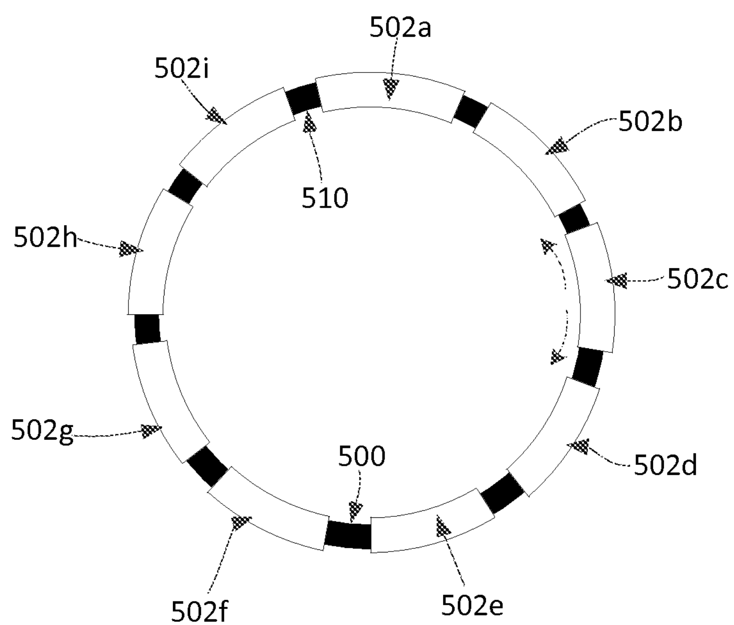
FIG. 5B shows another embodiment of a system for haptic feedback for modular devices.

FIG. 5B shows another embodiment of a system for haptic feedback for modular devices. In this embodiment, the computing device 500 is associated with a wearable device comprising a bracelet. The computing device may comprise a band 510. The band 510 may be configured to hold the computing device 500 around a user's wrist.

The band 510 may comprise one or more modules 502*a-i*. The modules 502*a-i* comprise the shape of beads or other bracelet components. The modules 502*a-i* may comprise one or more couplers for coupling to one another and/or the band 510. The computing device 500 can function and/or provide haptic effects using, for example, any of the methods described above with respect to FIGS. 1-4.

For example, the computing device 500 may detect a user attempting to couple a module 502*d* to the band 510. The computing device 500 may responsively output one or more haptic effects. In some embodiments, a module 502*c* may comprise a movement component (e.g., a motor and/or wheel). The movement component may be configured to receive a signal from the computing device 500 and responsively move the module 502*c* along the band 510 (e.g., in the directions depicted by the dashed arrows) and/or rotate the module 502*c* around the band 510. The computing device 500 may actuate the movement component to output the haptic effect. For example, the computing device 500 may actuate the movement component in a manner configured to move the module 502*c* back-and-forth along the band 510 (e.g., back-and-forth in the directions depicted by the dashed arrows). This may cause the band 510 to vibrate. The user may perceive this vibration as the haptic effect.

Figure 5C:
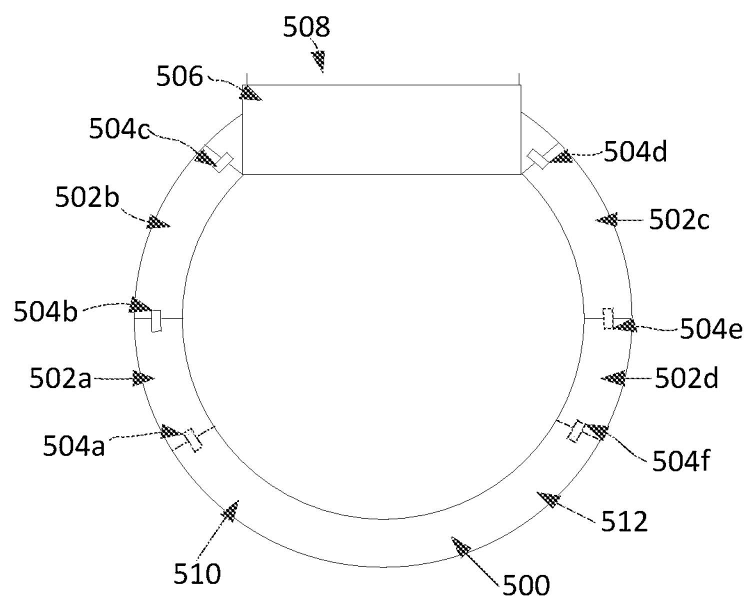
FIG. 5C shows still another embodiment of a system for haptic feedback for modular devices.

FIG. 5C shows still another embodiment of a system for haptic feedback for modular devices. In this embodiment, the modular computing device 500 is associated with a wearable device comprising a watch, such as a smart watch. The computing device 500 may comprise a device body 506 (e.g., a watch body) and a display 508 (e.g., a touch-screen display). A band 510 is coupled to the device body 506.

In some embodiments, the band 510 may comprise one or more modules 502*a-d*. The modules 502*a-d* may couple with one another and/or the device body 506 via couplers 504*a-f*. In some embodiments, the band 510 may comprise one or more links 512 configured to couple one or more modules 502*a*, 502*d* to one another and/or the device body 506. The computing device 500 and/or modules 502*a-d* can function and/or provide haptic effects using, for example, any of the methods described above with respect to FIGS. 1-4.

For example, the computing device 500 may detect a user attempting to couple a module 502*d* to another module 502*c* of the band 510. In some embodiments, the computing device 500 may responsively actuate a coupler 504*e* (e.g., an electromagnet) to, e.g., generate electromagnetic forces configured to pull the module 502*d* toward the other module 502*c*. The computing device 500 may generate such attraction forces if, for example, the modules 502*c* and 502*d* are compatible with one another. In some embodiments, the computing device 500 may actuate a coupler 504*e* (e.g., an electromagnet) to, e.g., generate electromagnetic forces configured to push the module 502*d* away from the other module 502*c*. The computing device 500 may generate such repelling forces if, for example, the modules 502*c* and 502*d* are not compatible with one another. The user may perceive the pushing or pulling forces and determine information about the module 502*d*, such as the compatibility of the module 502*d* with another module 502*c*. The pulling or pushing forces may further aid or prevent against the user coupling the module 502*d* to the computing device 500.

Illustrative Methods for Haptic Feedback for Modular Devices

Figure 6:
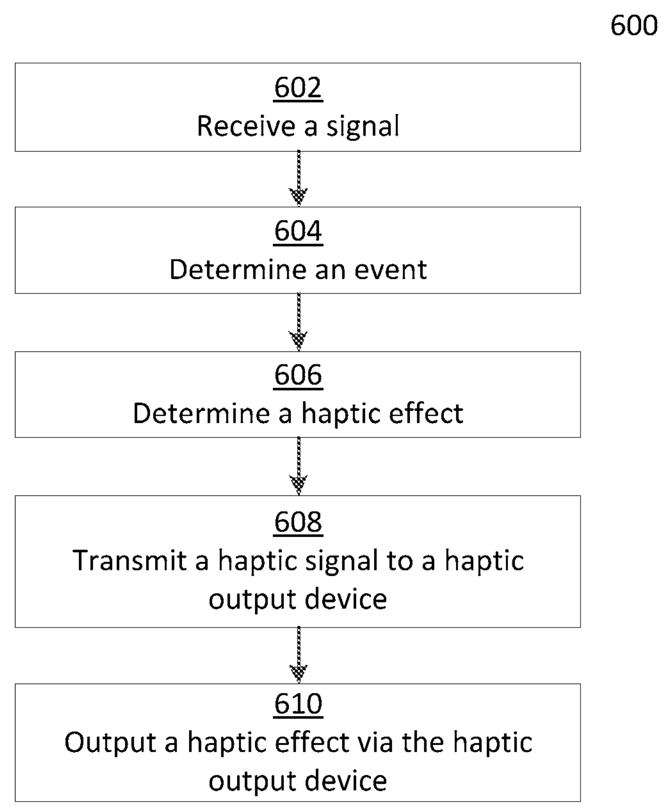
FIG. 6 is a flow chart of steps for performing a method for providing haptic feedback for modular devices according to one embodiment.

FIG. 6 is a flow chart of steps for performing a method for providing haptic feedback for modular devices according to one embodiment. In some embodiments, the steps in FIG. 6 may be implemented in program code that is executed by a processor, for example, the processor in a general purpose computer, a mobile device, or a server. In some embodiments, these steps may be implemented by a group of processors. In some embodiments one or more steps shown in FIG. 6 may be omitted or performed in a different order. Similarly, in some embodiments, additional steps not shown in FIG. 6 may also be performed. The steps below are described with reference to components described above with regard to computing device 101 shown in FIG. 1.

The method 600 begins at step 602 when a processor 102 or 138 receives a signal. The processor 102 or 138 may receive the signal from, for example, sensors 130, one or more modules 134 or 136 (e.g., a tuning module), and/or other devices. For example, upon the occurrence of an event (e.g., the user tilting the computing device 101), the sensors 130 (e.g., a gyroscope) may transmit a sensor signal associated with the event to a processor 102 or 138.

In some embodiments, the processor 102 or 138 receives a signal from the I/O components 112. In such an embodiment, the signal may be associated with a user interaction with a user interface device (e.g., a button, switch, lever, knob, and/or touch sensitive surface 116) associated with the computing device 101 and/or a module 134 or 136. For example, upon a user interacting with (e.g., tapping, gesturing along, etc.) the touch sensitive surface 116, the processor 102 or 138 receives a signal from the touch sensor 108 via the I/O components 112.

The method 600 continues at step 604 when a processor 102 or 138 determines an event. In some embodiments, the processor 102 or 138 may determine the event based on the signal. For example, the signal may comprise data indicative of an event. For instance, in one embodiment, the signal may comprise data indicating an explosion occurred in a video game, an application opened or closed, data was saved, the computing device 101 received a phone call, and/or any other event. In other embodiments, the processor 102 or 138 may analyze signal data to determine if an event occurred. For example, the processor 102 or 138 may compare signal data to data stored in a lookup table to determine if an event occurred. In one such embodiment, the signal data may comprise a direction, pressure, and/or velocity of a user interaction with the touch sensitive surface 116. The processor 102 or 138 may compare the direction, pressure, and/or velocity data to data stored in a lookup table to determine a gesture (e.g., a swipe, two-finger pinch, etc.) associated with the data. In some embodiments, the occurrence of a particular gesture or user input may comprise the event.

The method 600 continues at step 606 when a processor 102 or 138 determines a haptic effect. In some embodiments, the processor 102 or 138 determines the haptic effect based on the signal and/or event. For example, the processor 102 or 138 may access a lookup table stored in memory 104 to map a particular event to a particular haptic effect. In such an embodiment, the processor 102 or 138 may determine an event (e.g., comprising a phone call) has occurred and consult a lookup table to determine a corresponding haptic effect (e.g., a vibration).

In some embodiments, the event may comprise a user connecting a module 134 or 136 to the computing device 101. In such an embodiment, the processor 102 or 138 may determine a haptic effect comprising, e.g., a vibration or click sensation. This may confirm to the user that the module 134 or 136 is correctly and/or completely coupled to the computing device 101.

In some embodiments, the processor 102 or 138 may determine a haptic effect based on one or more characteristics (e.g., type, location, and/or capabilities) of a module 134. For example, the processor 102 or 138 may determine that a user is attempting to couple a module 134 to the computing device 101 that is redundant, incompatible with the computing device 101, harmful to the computing device 101, and/or otherwise unnecessary. In such an embodiment, the processor 102 or 138 may determine a haptic effect configured to resist against the user connecting the module 134 to the computing device 101. In other embodiments, the processor 102 or 138 may determine that a module 134 is compatible with and/or may improve the functioning of computing device 101. In such an embodiment, the processor 102 or 138 may determine a haptic effect configured to assist the user in connecting the module 134 or 136 to the computing device 101.

As another example, the processor 102 or 138 may determine a haptic effect based on the location of a haptic output device and/or module 134 or 136. For example, the event may comprise a user interaction with an upper right corner of the touch sensitive surface 116. The processor 102 or 138 may determine a location of a haptic output device 118 or 140. In some embodiments, if the haptic output device 118 or 140 is positioned near the user interaction (e.g., near the upper right corner of the touch sensitive surface 116), the processor 102 or 138 may determine a haptic effect, e.g., comprising a vibration. If the haptic output device is not positioned near the user interaction, the processor 102 or 138 may not determine a haptic effect. This may prevent the computing device 101 and/or modules 134 or 136 from outputting superfluous haptic effects that may be imperceptible or degraded to a user. In some embodiments, this may save battery power and improve the user experience.

In some embodiments, the processor 102 or 138 determines a haptic effect based on a previously-output haptic effect. For example, the processor 102 or 138 may receive a signal associated with a previously output haptic effect from a tuning module. The signal may comprise one or more characteristics of the previously output haptic effect. In some embodiments, the processor 102 or 138 may determine a haptic effect based on the one or more characteristics. For example, based on the magnitude of a previously output haptic effect (e.g., being smaller than desired), the processor 102 or 138 may determine a haptic effect comprising a larger magnitude.

In some embodiments, the processor 102 or 138 may determine a haptic effect based on a position of the computing device 101. For example, upon the occurrence of an event (e.g., the user pressing a button on the computing device 101), the processor 102 or 138 may determine a haptic effect configured to bend the computing device 101 and/or a module 134, 136 a specific amount (e.g., 30 degrees) with respect to a surface. Upon the occurrence of another event (e.g., the user again pressing the button on the computing device 101), the processor 102 may determine that the computing device 101 and/or module 134 or 136 is already positioned at the specific angle. Thus, the processor 102 or 138 may not determine a haptic effect.

In some embodiments, the processor 102 or 138 determines a haptic effect based on a characteristic associated with a virtual object. For example, the computing device 101 may detect a user interaction with a virtual object (e.g., an image output on a display) and transmit a signal associated with the virtual object to the processor 102 or 138. In some embodiments, the processor 102 or 138 may determine the haptic effect based on the height, width, shape, color, location, function, or texture of the virtual object. For example, if the virtual object comprises a wood desk, the processor 102 or 138 may determine a haptic effect comprising a wood texture.

In some embodiments, the processor 102 or 138 determines a haptic effect based on the characteristic associated with a user interaction with the computing device 101 and/or a module 134 or 136. In such an embodiment, the processor 102 or 138 may determine the haptic effect based on the type, location, duration, or other characteristics of the user interaction. For example, the processor 102 or 138 may determine a haptic effect comprising a vibration if the user holds a button on the computing device 101 and/or a module 134 or 136 for a period of time above a threshold. As another example, the processor 102 or 138 may determine a haptic effect if the user interaction comprises a swipe along a touch sensitive surface 116, and no haptic effect if the user interaction comprises tapping on the touch sensitive surface 116. As still another example, a user may interact with a user interface device (e.g., rotating a knob) associated with the computing device 101. In some embodiments, the processor 102 or 138 may receive an associated signal from the user interface device and determine a haptic effect based on the signal. The haptic effect may comprise, e.g., detents. This may, for example, simulate the feeling of a physical rotary knob.

In some embodiments, the computing device 101 and/or a module 134 or 136 may store associated "haptic profiles" in which a user can determine and save in memory (e.g., memory 104 and/or a memory enclosed within a module 134 or 136) a "profile" of the haptic effects the user would like associated with particular events. For example, in one embodiment, a user can select from a list of options which haptic effect the user would like associated with an event comprising low battery, receiving a phone call, or contact with a user interface component. In some embodiments, the list may comprise, for example, haptic effects such as high-magnitude vibration, pulsed vibration, or a low-magnitude vibration. In some embodiments, the processor 102 or 138 may consult with the user's haptic profile to determine which haptic effect to generate. For example, if the user's haptic profile associates an explosion in a video game with a haptic effect comprising a low-frequency vibration, in response to an explosion occurring in a video game (e.g., being played on the computing device 101), the processor 102 or 138 may determine a haptic effect comprising a low-frequency vibration.

In some embodiments, the processor 102 or 138 determines a plurality of haptic effects. Each of the plurality of haptic effects may be associated with a different characteristic of a virtual object and/or a user interaction (e.g., with the computing device 101 and/or module 134 or 136). For example, the computing device 101 may output a virtual slingshot on a touch-screen display. Upon the user contacting a location on the touch-screen display associated with an elastic band of the slingshot, the processor 102 or 138 may determine a haptic effect, e.g., associated with the texture of the band of the virtual slingshot (e.g., a rubber texture). The processor 102 or 138 may generate the haptic effect by, for example, actuating an electrostatic actuator coupled to (e.g., enclosed within or on a surface of) a module 134 or 136 and positioned behind the touch-screen display. The processor 102 or 138 may also determine another haptic effect, e.g., configured to resist the user's finger from sliding along the surface of the touch-screen display. The haptic effect may be configured to resist against the user's sliding finger by an amount of resistance associated with the elasticity of the band. In one such embodiment, the processor 102 or 138 may generate the haptic effect by, for example, increasing a perceived coefficient of friction on the surface of the touch-screen display (e.g., via another electrostatic actuator). In some embodiments, the multiple haptic effects may provide a more realistic and immersive representation of the virtual object (e.g., interacting with a slingshot).

The method 600 continues at step 608 when a processor 102 or 138 transmits a haptic signal to a haptic output device 118 or 140. The haptic signal is associated with the haptic effect. In some embodiments, the processor 102 or 138 may access drive signals stored in memory 104 and associated with particular haptic effects. In one embodiment, a signal is generated by accessing a stored algorithm and inputting parameters associated with an effect. For example, in such an embodiment, an algorithm may output data for use in generating a drive signal based on amplitude and frequency parameters. As another example, a haptic signal may comprise data to be decoded by the haptic output device. For instance, the haptic output device may itself respond to commands specifying parameters such as amplitude and frequency.

The method 600 continues at step 610 when a haptic output device (e.g., haptic output device 118 and/or haptic output device 140) outputs the haptic effect. The haptic output device receives the haptic signal and outputs the haptic effect. In some embodiments, the haptic output device may comprise a coupler configured to connect a module 134 or 136 to the housing 120 of the computing device 101. The haptic effect may comprise a texture (e.g., sandy, bumpy, or smooth), a vibration, a change in a perceived coefficient of friction, a change in temperature, a stroking sensation, an electro-tactile effect, or a deformation (e.g., a deformation of a surface associated with the computing device 101 and/or a module 134 or 136).

Figure 7:
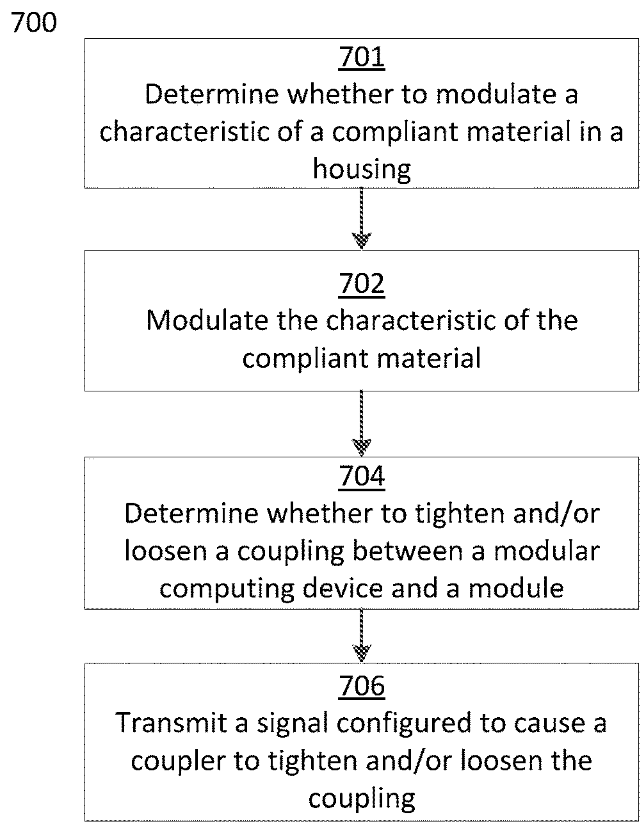
FIG. 7 is a flow chart of steps for performing a method for providing haptic feedback for modular devices according to another embodiment.

In some embodiments, the haptic output device may generate the haptic effect by actuating one or more couplers configured to connect a module 134 or 136 to a housing 120 of the computing device 101, e.g., as described in step 706 of FIG. 7. In other embodiments, the haptic output device may generate the haptic effect by rotating, vibrating, or otherwise moving a mass. In such an embodiment, the mass may comprise a module 134 or 136. The haptic output device may, for example, move the mass back-and-forth to output vibrations.

FIG. 7 is a flow chart of steps for performing a method for providing haptic feedback for modular devices according to another embodiment. In some embodiments, the steps in FIG. 7 may be implemented in program code that is executed by a processor, for example, the processor in a general purpose computer, a mobile device, or a server. In some embodiments, these steps may be implemented by a group of processors. In some embodiments one or more steps shown in FIG. 7 may be omitted or performed in a different order. Similarly, in some embodiments, additional steps not shown in FIG. 7 may also be performed. In some embodiments, one or more of the steps shown in FIG. 7 may be sub-steps within one of the steps of the method 600 described above. The steps below are described with reference to components described above with regard to computing device 101 shown in FIG. 1.

The method 700 begins at step 701 when a processor 102 or 138 determines whether to modulate a characteristic of a compliant material in a housing 120 or 142, e.g., to generate a haptic effect. For example, in one embodiment, the processor 102 or 138 may determine a haptic effect associated with a high-magnitude vibration. Because the compliant material in the housing 120 or 134 may be in a soft or flexible physical state, the compliant material may dampen the amplitude of vibrations output by a haptic output device 118 or 140. Thus, in some embodiments, the processor 102 or 138 may determine that the rigidity of the compliant material should be modulated. In one such embodiment, the processor 102 or 138 may determine that the rigidity of the compliant material should be increased. The increased rigidity may allow haptic forces to propagate through the housing 120, e.g., with minimal damping. This may increase the user's perception of the high-magnitude vibration.

The method 700 continues at step 702 when a processor 102 or 138 modulates the characteristic of a compliant material in a housing 120 or 142. In some embodiments, the compliant material may comprise a smart gel, shape-memory alloy, or rheological fluid. The processor 102 or 138 may apply electricity, heat, a magnetic field, or an electric field to the compliant material to cause a characteristic of the compliant material to change. For example, in some embodiments, the user may be holding the computing device 101 in the user's hand. The housing 120 of the computing device 101 may comprise the compliant material. In such an embodiment, to output a damped haptic effect, the processor 102 or 138 may apply electricity or an electric field to the compliant material, causing it to become more flexible or soft. The flexible compliant material may dampen haptic forces that propagate through the housing 120. This may dampen haptic effects perceived by the user. As another example, in some embodiments, the processor 102 may cause the compliant material to become more rigid. This rigidity may allow haptic forces to propagate through the housing 120, e.g., with minimal damping. This may increase the strength of the haptic effects perceived by the user.

The method 700 continues at step 704 when a processor 102 or 138 determines whether to tighten and/or loosen a coupling between a modular computing device 101 (e.g., housing 120) and a module 134 or 136. For example, the processor 102 or 138 may determine that generating a haptic effect requires, at least in part, tightening and/or loosening the coupling. As another example, the processor 102 or 138 may determine that the event comprises a user shaking the computing device 101. To counteract the shaking forces and/or prevent a module 134 or 136 from becoming loose in a module holder 132*a-b*, the processor 102 or 138 may determine that the coupling should be tightened.

In some embodiments, the processor 102 or 138 may determine whether to tighten or loosen the coupling between the computing device 101 and a module 134 or 136 based on how strong the coupling already is between the computing device 101 and the module 134 or 136. In some embodiments, the processor 102 or 138 may estimate the strength of the coupling between the computing device 101 and a module 134 or 136 based on one or more characteristics of a module holder 132*a-b*. For example, the processor 102 or 138 may determine the strength of the coupling based on the amount of power transmitted to, the size of, the type of, and/or a material within an electromagnetic component that is coupling the computing device 101 to a module 134 or 136. In such an embodiment, if the processor 102 or 138 determines that the strength of the coupling is high, the processor 102 or 138 may determine that there is no need to further tighten the coupling. If the processor 102 or 138 determines that the strength of the coupling is low, the processor 102 or 138 may determine that the coupling needs to be tightened.

In some embodiments the processor 102 or 138 may determine the strength of the coupling based on sensor signals from a sensor 130. For example, in some embodiments, a sensor 130 (e.g., a force sensor) may be positioned within a module holder 132*a-b* and/or coupled to a module 134 or 136. The sensor 130 may be configured to detect the amount of force a module 134 or 136 exerts against its respective module holder 132*a* or 132*b* (e.g., when the module 134 or 136 is positioned within the module holder 132*a-b*). In such an embodiment, if the processor 102 or 138 receives a sensor signal via sensor 130 that is indicative of a large amount of force, the processor 102 or 138 may determine that the coupling between a module 134 or 136 and its respective module holder 132*a* or 132*b* is strong. If the processor 102 or 138 receives a sensor signal via sensor 130 that is indicative of a small amount of force, the processor 102 or 138 may determine that the coupling between a module 134 or 136 and its respective module holder 132*a* or 132*b* is weak. In some embodiments, the processor 102 or 138 may determine whether the coupling needs to be tightened or loosened based on the sensor signal. For example, the processor 102 or 138 may determine that the strength of the coupling is weak and that the coupling should to be tightened. As another example, the processor 102 or 138 may determine that the strength of the coupling is too strong and that the coupling should be loosened (e.g., to prevent against damaging the computing device 101 or a module 134 or 136).

The method 700 continues at step 706 when a processor 102 or 138 transmits a signal to a coupler configured to cause the coupler to tighten and/or loosen the coupling between the computing device 101 and the module 134 or 136. In some embodiments, the haptic output device (e.g., haptic output device 118 and/or haptic output device 140) may comprise the coupler and the signal may comprise the haptic signal. In some embodiments, the tightening and/or loosening of the coupling generates the haptic effect.

For example, in some embodiments, the coupler comprises an electromagnet, a solenoid, and/or another actuatable locking mechanism. The coupler may receive the haptic signal from a processor 102 or 138 and repeatedly tighten and loosen one or more couplings between the computing device 101 and one or more modules 134 or 136. This may cause one or more of the modules 134 or 136 to vibrate within and/or impact the sides of a module holder 132*a-b* and/or the housing 120. In some embodiments, the haptic effect may comprise the vibrations.

In some embodiments, the coupler may receive a signal from a processor 102 or 138 and tighten the coupling between the computing device 101 and one or more modules 134 or 136, e.g., to counteract forces on the computing device 101 generated by the user. For example, the processor 102 or 138 may receive a sensor signal from sensor(s) 130 (e.g., an accelerometer) configured to detect how vigorously the user is shaking the computing device 101. In such an embodiment, if the user is shaking the computing device 101 using a large amount of force, the processor 102 or 138 may apply more power to the coupler (e.g., an electromagnet) to tighten the coupling between the computing device 101 and a module 134 or 136. This may prevent a module 134 or 136 from becoming loose or decoupled from the computing device 101.

In some embodiments, the coupler may receive a signal from a processor 102 or 138 and loosen the coupling between the computing device 101 and one or more modules 134 or 136, e.g., to modulate a characteristic of a haptic effect. For example, the processor 102 or 138 may transmit a haptic signal to a haptic output device 118 or 140 configured to cause the haptic output device to vibrate. In such an embodiment, the processor 102 or 138 may additionally transmit a signal to one or more couplers configured to cause the coupler to loosen a coupling between the computing device 101 and the one or more modules 134 or 136. This may allow the modules 134 or 136 to vibrate and/or move responsive to the vibratory haptic effect. In some embodiments, the motion of the modules 134 or 136 may change a characteristic of the haptic effect perceived by the user.

For example, if the coupling between the computing device 101 and the modules 134 or 136 is tight, the user may perceive the haptic effect as a single vibration through the housing 120 of the computing device 101. If the coupling between the computing device 101 and the modules 134 or 136 is loose, however, the user may perceive the haptic effect as a composite of multiple vibrations. Each of the vibrations may be perceptibly different. For example, in one embodiment, each of the modules 134 or 136 may be positioned at different distances from the haptic effect source (e.g., the haptic output device 118 or 140), coupled to the computing device 101 with different strengths, and/or may comprise different compliant materials. This may cause each of the modules 134 or 136 to impact the sides of a respective module holder 132*a-b* differently, generating vibrations with different characteristics. In some embodiments, the user may be able to perceive each of these vibrations as a different haptic effect. In other embodiments, the user may perceive a single composite haptic effect comprising the individual vibrations.

Additional Embodiments for Haptic Feedback for Modular Devices

Figure 8:
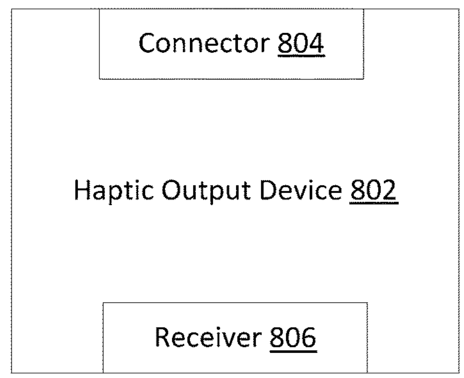
FIG. 8 is a block diagram showing a system for haptic feedback for modular devices.

FIG. 8 is a block diagram showing a system for a haptic feedback for modular devices according to one embodiment. The system includes a haptic output device 802. In this embodiment, the haptic output device 802 comprises a connector 804. The connector 804 is configured to electrically and/or mechanically couple the haptic output device 802 to another component (e.g., the modular computing device). In some embodiments, the connector comprises a magnet, snap-in component, screw, bolt, wire, strap, locking device, and/or a coupler (e.g., as described above with respect to FIG. 4). The haptic output device 802 also comprises a receiver. The receiver comprises an electrical interface configured to receive a haptic signal (e.g., from a processor). The haptic output device 802 may output a haptic effect responsive to receiving the haptic signal.

In some embodiments, the haptic output device 802 is an integrated component of (e.g., enclosed within) a modular computing device. In such an embodiment, the connecter 804 (e.g., a bracket) may be configured to couple the haptic output device 802 to, e.g., an interior wall of an outer housing of the modular computing device. In other embodiments, the haptic output device 802 comprises, or is an integrated component of, an external electronic module. In one such embodiment, the connector may comprise a coupler (e.g., an electromagnet) configured to mechanically and electrically couple the haptic output device 802 to the modular computing device. In another such embodiment, the connector 804 may be configured to mechanically couple the haptic output device 802 to, e.g., an interior wall of an outer housing of the external electronic module.

Advantages of Haptic Feedback for Modular Devices

There are numerous advantages of providing haptic feedback for modular devices. Such systems may allow computing devices that are otherwise unable to output haptic feedback to output haptic feedback. For example, a computing device may lack haptic capabilities. A user may couple a haptic module (e.g., comprising an ERM) to the computing device, thereby enabling the computing device to output haptic effects.

In some embodiments, haptic feedback for modular devices may allow a user to customize or modify the haptic effects output by the user's computing device. For example, a user may be unhappy with the type and/or quality of haptic effects output by the user's computing device (e.g., mobile phone). In some embodiments, the user may be able to purchase or otherwise obtain a haptic module, couple the haptic module to the computing device, and modify the haptic effects output by the computing device. This may provide the user with greater flexibility as to the type and/or quality of haptic effects output by the user's computing device.

In some embodiments, haptic feedback for modular devices can allow a user to exchange the user's computing device, e.g., for a newer and/or different model, while providing a consistent and/or improved haptic experience. For example, the user may remove a haptic module from the user's old computing device and couple it to the new computing device. In some embodiments, this may cause the new computing device to output similar haptic effects as the old computing device, maintaining a consistent haptic experience. In other embodiments, the new computing device may output new haptic effects based on one or more characteristics of the new computing device. For example, if the new computing device is deformable (e.g., and the old computing device was not), the new computing device may be able to output deformation haptic effects via the haptic module. This may improve the user's haptic experience.

In some embodiments, the user may be able to remove other modules (e.g., a tuning module, a processor module, a memory module, etc.) from the user's old computing device and couple them to the new computing device. This may allow the user to reuse modules from the user's old computing device with a new computing device, e.g., to provide a consistent or enhanced user experience. In some embodiments, this may reduce costs for the user, because the user may not need to re-purchase certain hardware and/or software components (e.g., a processor and/or haptic output device) when the user changes computing devices.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, in which other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A haptic output device comprising:

a connector configured to couple the haptic output device to a modular computing device, wherein the modular computing device comprises an outer housing configured to mechanically and electrically couple with one or more external electronic modules; and a receiver configured to receive a haptic signal;

wherein the haptic output device is configured to output a haptic effect responsive to receiving the haptic signal, and wherein:

the haptic output device is configured to output the haptic effect by tightening or loosening a coupling between the outer housing of the modular computing device and an external electronic module of the one or more external electronic modules, or the haptic effect is configured to assist a user in coupling the external electronic module to the modular computing device, or the haptic effect is configured to resist against the external electronic module coupling to the modular computing device.

2. The haptic output device of claim 1, wherein the haptic output device is enclosed within the modular computing device.

3. The haptic output device of claim 1, wherein the haptic output device is the external electronic module.

4. The haptic output device of claim 1, wherein the haptic output device is configured to output the haptic effect by tightening or loosening the coupling between the outer housing and the external electronic module responsive to receiving the haptic signal.

5. The haptic output device of claim 1, wherein the outer housing of the modular computing device includes a compliant material comprising a shape memory alloy, a smart gel, an electro-rheological fluid, or a magneto-rheological fluid, and wherein a processor is configured to modulate a characteristic of the compliant material to modify an amplitude of the haptic effect.

6. The haptic output device of claim 1, wherein the haptic effect is configured to assist the user in coupling the external electronic module to the modular computing device.

7. The haptic output device of claim 1, wherein the haptic output device is configured to generate the haptic effect, in part, by moving a mass comprising an external electronic module.

8. The haptic output device of claim 1, wherein the modular computing device is associated with a wearable device comprising a sleeve, jacket, glove, ring, watch, wristband, collar, shirt, article of clothing, hat, headband, jewelry, shoes, and/or glasses.

9. The haptic output device of claim 1, wherein the haptic effect is configured to resist against the external electronic module coupling to the modular computing device.

10. A method comprising:

determining, by a processor of a modular computing device having an outer housing configured to mechanically and electrically couple with one or more external electronic modules, a haptic effect to output;

transmitting, by the processor, a haptic signal associated with the haptic effect to a haptic output device, wherein the haptic output device is configured to receive the haptic signal via a receiver and output the haptic effect, and wherein:

the haptic output device is configured to output the haptic effect by tightening or loosening a coupling between the outer housing of the modular computing device and an external electronic module of the one or more external electronic modules, or the haptic effect is configured to assist a user in coupling the external electronic module to the modular computing device, or the haptic effect is configured to resist against the external electronic module coupling to the modular computing device.

11. The method of claim 10, wherein the haptic output device is the external electronic module.

12. The method of claim 10, wherein the haptic output device is configured to output the haptic effect by tightening or loosening the coupling between the outer housing and the external electronic module responsive to receiving the haptic signal.

13. The method of claim 10, further comprising:

modulating a characteristic of a compliant material in the outer housing of the modular computing device to modify an amplitude of the haptic effect, the compliant material comprising a shape memory alloy, a smart gel, an electro-rheological fluid, or a magneto-rheological fluid.

14. The method of claim 10, wherein the haptic effect is configured to resist against the external electronic module coupling to the modular computing device.

15. The method of claim 10, wherein the haptic output device is configured to generate the haptic effect, in part, by moving a mass comprising an external electronic module.

16. The method of claim 10, wherein the modular computing device is associated with a wearable device comprising a sleeve, jacket, glove, ring, watch, wristband, collar, shirt, article of clothing, hat, headband, jewelry, shoes, and/or glasses.

17. The method of claim 10, wherein the haptic effect is configured to assist the user in coupling the external electronic module to the modular computing device.

18. The method of claim 10, wherein the haptic output device is the external electronic module.

19. A non-transient computer readable medium comprising program code that is executable by a processor of a modular computing device having an outer housing configured to receive one or more external electronic modules, the program code being executable by the processor to cause the processor to:

determine a haptic effect to output; and transmit a haptic signal associated with the haptic effect to a haptic output device, wherein the haptic output device is configured to receive the haptic signal and output the haptic effect, and wherein:

the haptic output device is configured to output the haptic effect by tightening or loosening a coupling between the outer housing of the modular computing device and an external electronic module of the one or more external electronic modules, or the haptic effect is configured to assist a user in coupling the external electronic module to the modular computing device, or the haptic effect is configured to resist against the external electronic module coupling to the modular computing device.

20. The non-transient computer readable medium of claim 19, wherein the haptic output device is configured to output the haptic effect by tightening or loosening the coupling between the outer housing and the external electronic module responsive to receiving the haptic signal.

21. The non-transient computer readable medium of claim 19, further comprising program code which when executed by the processor is configured to cause the processor to:

modulate a characteristic of a compliant material in the outer housing of the modular computing device to modify an amplitude of the haptic effect, the compliant material comprising a shape memory alloy, a smart gel, an electro-rheological fluid, or a magneto-rheological fluid.

22. The non-transient computer readable medium of claim 19, wherein the haptic effect is configured to resist against the external electronic module coupling to the modular computing device.

23. The non-transient computer readable medium of claim 19, wherein the haptic effect is configured to assist the user in coupling the external electronic module to the modular computing device.

24. The non-transient computer readable medium of claim 19, wherein the haptic output device is the external electronic module.

* * * * *